United States Patent
Nishiwaki

(10) Patent No.: US 12,485,901 B2
(45) Date of Patent: Dec. 2, 2025

(54) TRAVEL SUPPORT DEVICE, TRAVEL SUPPORT METHOD, AND MEDIUM

(71) Applicant: Mitsubishi Electric Corporation, Tokyo (JP)

(72) Inventor: Kazuhiro Nishiwaki, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 161 days.

(21) Appl. No.: 18/456,605

(22) Filed: Aug. 28, 2023

(65) Prior Publication Data

US 2024/0140439 A1 May 2, 2024

(30) Foreign Application Priority Data

Oct. 28, 2022 (JP) .................................. 2022-172843

(51) Int. Cl.
*B60W 40/04* (2006.01)
*B60W 60/00* (2020.01)

(52) U.S. Cl.
CPC .......... *B60W 40/04* (2013.01); *B60W 60/001* (2020.02); *B60W 2554/4041* (2020.02); *B60W 2554/80* (2020.02)

(58) Field of Classification Search
CPC ............... B60W 40/04; B60W 60/001; B60W 2554/4041; B60W 2554/80
USPC ......................................................... 701/23
See application file for complete search history.

(56) References Cited

U.S. PATENT DOCUMENTS

| | | | |
|---|---|---|---|
| 8,219,298 B2 | 7/2012 | Nishira et al. | |
| 8,788,134 B1* | 7/2014 | Litkouhi | B60W 30/16 701/23 |
| 10,040,453 B2* | 8/2018 | Gaither | B60W 50/06 |
| 10,202,112 B2* | 2/2019 | Gaither | B60W 10/06 |
| 10,388,166 B2* | 8/2019 | Takeda | G01S 17/87 |
| 10,730,521 B2* | 8/2020 | Likhachev | B60W 30/18163 |
| 11,186,282 B2* | 11/2021 | Hammoud | G08G 1/163 |
| 11,491,987 B1* | 11/2022 | Ward | B60W 30/18163 |
| 12,115,964 B1* | 10/2024 | Hawley | B60W 30/18163 |
| 12,266,017 B1* | 4/2025 | Hanson | G01P 3/00 |
| 2005/0256630 A1 | 11/2005 | Nishira et al. | |
| 2017/0270799 A1* | 9/2017 | Takeda | B62D 15/02 |

(Continued)

FOREIGN PATENT DOCUMENTS

| | | | | |
|---|---|---|---|---|
| CN | 114019962 A | * | 2/2022 | G05D 1/0236 |
| CN | 115402319 A | * | 11/2022 | B60W 50/00 |

(Continued)

OTHER PUBLICATIONS

Communication dated Sep. 30, 2025 in Japanese Application No. 2022-172843.

*Primary Examiner* — Atul Trivedi
(74) *Attorney, Agent, or Firm* — Sughrue Mion, PLLC

(57) ABSTRACT

A travel support device includes processing circuitry configured to output a target speed of a merging vehicle that is going to change lanes; acquire a current speed of the merging vehicle and calculate a first control amount; acquire a position and a speed of a merging destination vehicle; acquire a current position of the merging vehicle and calculate a second control amount; acquire a speed of the merging vehicle and calculate a predicted position of the merging destination vehicle when the current speed of the merging vehicle has reached the target speed; and output one of the first or second control amount.

12 Claims, 14 Drawing Sheets

(56) References Cited

U.S. PATENT DOCUMENTS

| | | | |
|---|---|---|---|
| 2018/0148036 A1* | 5/2018 | Gaither | B60W 20/12 |
| 2019/0143972 A1* | 5/2019 | Ishioka | B60W 30/162 |
| | | | 701/70 |
| 2019/0193737 A1* | 6/2019 | Likhachev | B60W 30/18163 |
| 2020/0307589 A1* | 10/2020 | Li | B60W 60/0023 |
| 2020/0307600 A1 | 10/2020 | Sato | |
| 2020/0406969 A1* | 12/2020 | Ersal | B60W 10/20 |
| 2022/0082403 A1* | 3/2022 | Shapira | G06V 10/762 |
| 2022/0144274 A1* | 5/2022 | Kudo | B60W 30/18159 |
| 2022/0161824 A1* | 5/2022 | Refaat | B60W 60/00272 |
| 2022/0171401 A1* | 6/2022 | Usman | G05D 1/0221 |
| 2022/0250641 A1* | 8/2022 | Seegmiller | B60W 30/18163 |
| 2022/0306112 A1* | 9/2022 | Yan | B60W 40/04 |
| 2023/0322267 A1* | 10/2023 | Mei | B60W 30/165 |
| | | | 701/26 |
| 2024/0051540 A1* | 2/2024 | Aotani | B60W 30/18163 |
| 2024/0190434 A1* | 6/2024 | Zeiynali Farid | |
| | | | B60W 30/18018 |
| 2024/0262366 A1* | 8/2024 | Takashima | B60W 30/0956 |
| 2024/0326816 A1* | 10/2024 | Karunakaran | B60W 30/18163 |
| 2025/0058781 A1* | 2/2025 | Shoemaker | B60W 60/001 |
| 2025/0058803 A1* | 2/2025 | Shoemaker | B60W 60/00276 |
| 2025/0124783 A1* | 4/2025 | Huang | G08G 1/20 |
| 2025/0239164 A1* | 7/2025 | Liu | G08G 1/167 |

FOREIGN PATENT DOCUMENTS

| | | | | |
|---|---|---|---|---|
| CN | 119190019 A | * | 12/2024 | B60W 30/025 |
| CN | 119305550 A | * | 1/2025 | B62D 6/00 |
| DE | 102023120743 A1 | * | 2/2025 | G08G 1/096725 |
| GB | 2601837 A | * | 6/2022 | G06F 18/251 |
| JP | 2005-324727 A | | 11/2005 | |
| JP | 4379199 B2 | | 12/2009 | |
| JP | 2019-133337 A | | 8/2019 | |
| JP | 2020-160885 A | | 10/2020 | |
| WO | WO-2022186003 A1 | * | 9/2022 | G08G 1/0969 |
| WO | WO-2024003974 A1 | * | 1/2024 | B60W 40/02 |

* cited by examiner

TRAVEL SUPPORT DEVICE, TRAVEL SUPPORT METHOD, AND MEDIUM

TECHNICAL FIELD

The present disclosed technique relates to a travel support technique for supporting travel of a vehicle.

BACKGROUND ART

Some travel support techniques provide support when a merging vehicle traveling toward a merging destination changes lanes.

For example, Patent Literature 1 discloses a lane change support device that supports when a host vehicle (corresponding to a merging vehicle) traveling toward a lane change destination (corresponding to a merging destination) changes lanes.

Specifically, the lane change support device of Patent Literature 1 determines whether or not the host vehicle can change lanes in view of a distance between the vehicles traveling in the lane change destination on the assumption that the host vehicle performs the uniform speed movement, and when the lane change is not possible, the lane change support device sets a target speed for the host vehicle to perform the uniform speed movement in order to make it possible to change lanes (Particularly, FIGS. 8, 9, and 10 in PTL 1 and description thereof).

CITATION LIST

Patent Literature

Patent Literature 1: JP 2005-324727 A

SUMMARY OF INVENTION

Technical Problem

However, in the conventional drive support technique such as the lane change support device described in Patent Literature 1, when the merging vehicle can change lanes in view of the distance between the vehicles traveling at the merging destination, the speed of the merging vehicle and the speed of a merging destination vehicle may be greatly different. Therefore, the conventional travel support technique has a problem that there is a case where the merging vehicle obstructs a traffic flow at a merging destination.

The present disclosure has been made to solve the above problem, and an object of the present disclosure is to prevent a merging vehicle from obstructing a traffic flow at a merging destination.

Solution to Problem

A travel support device of the present disclosure includes: processing circuitry configured to
  output a target speed of a merging vehicle that is going to change lanes to a merging destination lane;
  acquire a current speed of the merging vehicle and calculate a first control amount that matches the current speed with the target speed;
  acquire a position and a speed of at least one merging destination vehicle that is a vehicle traveling in the merging destination lane;
  acquire a current position of the merging vehicle and calculate a second control amount that maintains a first inter-vehicle distance between the merging vehicle and the at least one merging destination vehicle by using a position of the merging vehicle, a position of the at least one merging destination vehicle, and a speed of the at least one merging destination vehicle;
  acquire a speed of the merging vehicle and calculate a predicted position of the at least one merging destination vehicle in a case where it is assumed that the current speed of the merging vehicle has reached the target speed by using the speed of the merging vehicle, the target speed, the position of the at least one merging destination vehicle, and the speed of the at least one merging destination vehicle; and
  output one of the first control amount and the second control amount by using the speed of the merging vehicle, the speed of the at least one merging destination vehicle, and the predicted position of the at least one merging destination vehicle.

Advantageous Effects of Invention

According to the present disclosure, it has an effect of being able to prevent a merging vehicle from obstructing a traffic flow at a merging destination.

DESCRIPTION OF EMBODIMENTS

In order to explain the present disclosure in more detail, embodiments of the present disclosure will be described below with reference to the accompanying drawings.

First Embodiment

In a first embodiment, a basic functional configuration of a travel support device and processing by the configuration will be described.

Figure 1:
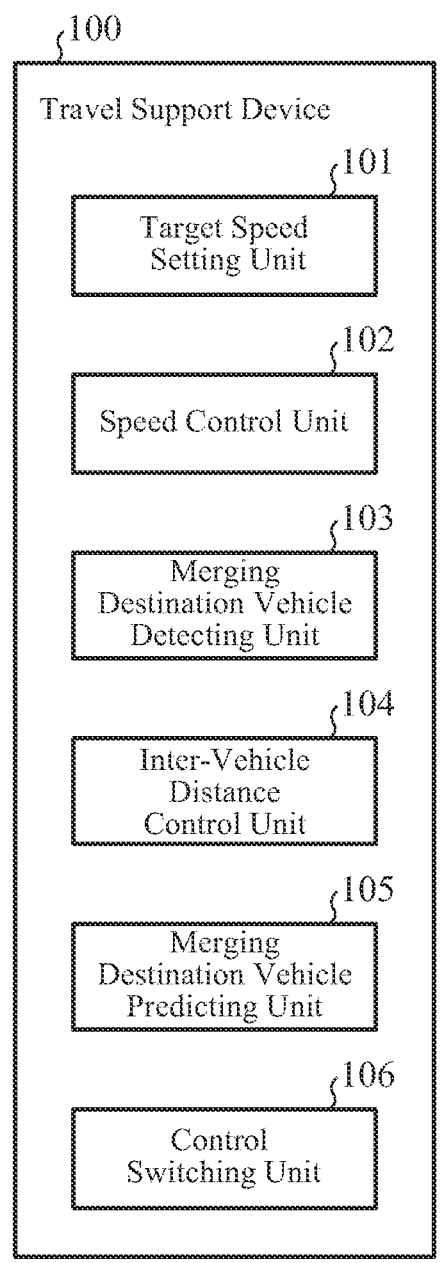
FIG. 1 is a diagram illustrating a configuration example of a travel support device according to a first embodiment.

FIG. 1 is a diagram illustrating a configuration example of a travel support device 100 according to the first embodiment. In FIG. 1, the internal configuration of the travel support device 100 is expressed in the form of functional blocks. Note that an example of a hardware configuration for implementing the function will be described later in a second embodiment.

The travel support device 100 includes a target speed setting unit 101, a speed control unit 102, a merging destination vehicle detecting unit 103, an inter-vehicle distance control unit 104, a merging destination vehicle predicting unit 105, and a control switching unit 106.

The target speed setting unit 101 outputs a target speed of a merging vehicle that is going to change lanes to a merging destination lane.

The target speed is, for example, a legal speed limit of the merging destination lane. In this case, the target speed setting unit 101 acquires, for example, a legal speed limit included in map information, and sets the target speed.

Note that the target speed may be configured to use a preset fixed value. Alternatively, the target speed may be configured to use a target speed preset by a user such as a driver.

The speed control unit 102 acquires the current speed of the merging vehicle, and calculates a control amount that matches the current speed with the target speed.

As a calculation method by which the speed control unit 102 calculates the control amount that matches the current speed with the target speed, specifically, for example, one calculation method described in the second embodiment described later can be considered. However, in the present disclosure, it is also possible to implement the calculation method by applying one of various calculation methods disclosed at the time of filing of the present application to the present disclosure.

The control amount output by the speed control unit 102 is, for example, an acceleration command indicating acceleration.

The merging destination vehicle detecting unit 103 acquires a position and a speed of the merging destination vehicle that is a vehicle traveling in the merging destination lane.

As an acquisition method by which the merging destination vehicle detecting unit 103 acquires the position and speed of the merging destination vehicle, specifically, for example, one acquisition method described in the second embodiment described later can be considered. However, the acquisition method can also be implemented by applying one of various acquisition methods disclosed at the time of filing of the present application to the present disclosure.

The inter-vehicle distance control unit 104 acquires the current position of the merging vehicle, and calculates a control amount that maintains an inter-vehicle distance between the merging vehicle and the merging destination vehicle by using the position of the merging vehicle, the position of the merging destination vehicle, and the speed of the merging destination vehicle.

As a calculation method by which the inter-vehicle distance control unit 104 calculates the control amount, specifically, for example, one calculation method described in the second embodiment described later can be considered. However, in the present disclosure, it is also possible to implement the calculation method by applying one of various calculation methods disclosed at the time of filing of the present application to the present disclosure.

The control amount output by the inter-vehicle distance control unit 104 is, for example, an acceleration command.

An example of an internal configuration of the inter-vehicle distance control unit 104 will be described.

The inter-vehicle distance control unit 104 includes, for example, a first inter-vehicle distance control unit and a second inter-vehicle distance control unit.

The first inter-vehicle distance control unit (First inter-vehicle distance control unit (1) described below, for example) calculates a control amount that maintains the inter-vehicle distance between the merging vehicle and the merging destination vehicle ahead of the merging vehicle.

The second inter-vehicle distance control unit (Second inter-vehicle distance control unit (2) to be described later, for example) calculates a control amount that maintains the inter-vehicle distance between the merging vehicle and the merging destination vehicle behind the merging vehicle.

The inter-vehicle distance control unit 104 outputs a control amount selected from the control amount of the first inter-vehicle distance control unit and the control amount of the second inter-vehicle distance control unit on the basis of a predetermined condition related to the magnitude of the control amount. As a result, for example, it is possible to select a control amount that enables more efficient merging flow of traffic between the merging destination vehicles from a control amount that allows merging ahead of or behind the merging destination vehicles.

Note that, when a plurality of merging destination vehicles is detected, the inter-vehicle distance control unit 104 includes a first inter-vehicle distance control unit and a second inter-vehicle distance control unit for each of the plurality of merging destination vehicles.

The inter-vehicle distance control unit 104 outputs a control amount selected on the basis of a predetermined condition related to the magnitude of the control amount from among the control amounts calculated by the plurality of first inter-vehicle distance control units and the control amounts calculated by the plurality of second inter-vehicle distance control units.

As a result, for example, it is possible to select a control amount that enables more efficient merging flow of traffic between the merging destination vehicles from among control amounts that allow merging of traffic between the plurality of merging destination vehicles.

The merging destination vehicle predicting unit 105 acquires the speed of the merging vehicle, and calculates a predicted position of the merging destination vehicle in a case where it is assumed that the current speed of the merging vehicle has reached the target speed by using the speed of the merging vehicle, the target speed, the position of the merging destination vehicle, and the speed of the merging destination vehicle.

The predicted position of the merging destination vehicle predicted by the merging destination vehicle predicting unit 105 is indicated using, for example, an inter-vehicle distance between the merging vehicle and the merging destination vehicle at a target time at which the merging vehicle is supposed to accelerate within a range of a predetermined acceleration limit and reach the target speed.

As a calculation method by which the merging destination vehicle predicting unit 105 calculates the predicted position of the merging destination vehicle, specifically, for example, one calculation method described in the second embodiment described later is conceivable. However, in the present disclosure, it is also possible to implement the calculation method by applying one of various calculation methods disclosed at the time of filing of the present application to the present disclosure.

The control switching unit 106 outputs one of the control amount by the speed control unit 102 and the control amount by the inter-vehicle distance control unit 104 by using the speed of the merging vehicle, the speed of the merging destination vehicle, and the predicted position of the merging destination vehicle.

Specifically, for example, the control switching unit 106 outputs the control amount of the speed control unit 102 in a case where the predicted position of the merging destination vehicle is not present within a predetermined range ahead of or behind the predicted position of the merging vehicle. In addition, for example, the control switching unit 106 outputs the control amount of the inter-vehicle distance control unit 104 in a case where the predicted position of the merging destination vehicle is present within a predetermined range ahead of or behind the predicted position of the merging vehicle.

The control switching unit 106 outputs an acceleration command, which is a control amount, to, for example, a drive and brake control device (a drive and brake control device not illustrated in FIG. 1) that controls drive and brake of the merging vehicle.

As an output method by which the control switching unit 106 outputs one of the control amount by the speed control unit 102 and the control amount by the inter-vehicle distance control unit 104, specifically, for example, one output method described in the second embodiment described later is conceivable. However, in the present disclosure, it is also possible to implement the output method by applying one of various output methods disclosed at the time of filing of the present application to the present disclosure.

Processing performed by the travel support device 100 will be described.

Figure 2:
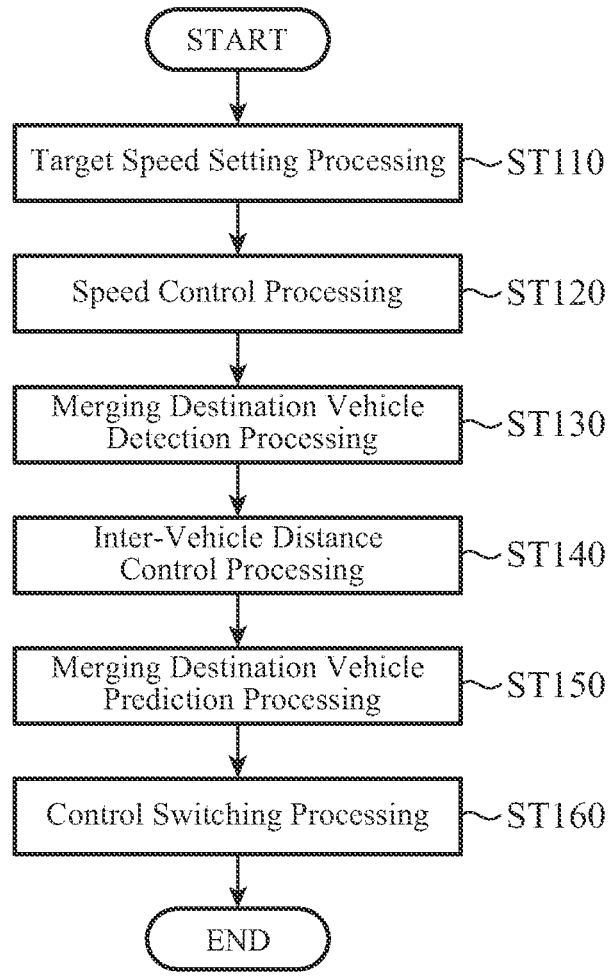
FIG. 2 is a flowchart illustrating an example of processing performed in the travel support device according to the first embodiment.

FIG. 2 is a flowchart illustrating an example of processing performed by the travel support device 100 according to the first embodiment.

When the processing is started, the travel support device 100 executes target speed setting processing (step ST110). Specifically, the target speed setting unit 101 in the travel support device 100 outputs the target speed of the merging vehicle that is going to change lanes to the merging destination lane.

The travel support device 100 executes speed control processing (step ST120).

Specifically, the speed control unit 102 in the travel support device 100 acquires the current speed of the merging vehicle and calculates a control amount that matches the current speed with the target speed.

The travel support device 100 executes merging destination vehicle detection processing (step ST130).

Specifically, the merging destination vehicle detecting unit 103 in the travel support device 100 acquires the position and speed of the merging destination vehicle that is a vehicle traveling in the merging destination lane.

The travel support device 100 executes inter-vehicle distance control processing (step ST140).

Specifically, the inter-vehicle distance control unit 104 in the travel support device 100 acquires the current position of the merging vehicle, and calculates a control amount that maintains the inter-vehicle distance between the merging vehicle and the merging destination vehicle by using the position of the merging vehicle, the position of the merging destination vehicle, and the speed of the merging destination vehicle.

The travel support device 100 executes merging destination vehicle prediction processing (step ST150).

Specifically, the merging destination vehicle predicting unit 105 in the travel support device 100 acquires the speed of the merging vehicle, and calculates the predicted position of the merging destination vehicle when it is assumed that the current speed of the merging vehicle has reached the target speed by using the speed of the merging vehicle, the target speed, the position of the merging destination vehicle, and the speed of the merging destination vehicle.

The travel support device 100 executes control switching processing (step ST160).

Specifically, the control switching unit 106 in the travel support device 100 outputs one of the control amount by the speed control unit 102 and the control amount by the inter-vehicle distance control unit 104 by using the speed of the merging vehicle, the speed of the merging destination vehicle, and the predicted position of the merging destination vehicle.

After executing the processing of step ST160, the travel support device 100 terminates the processing.

Alternatively, the travel support device 100 repeats the processing from step ST110.

The travel support device 100 configured as described above can sufficiently accelerate the host vehicle traveling in the merging lane to smoothly move the host vehicle to a main lane.

The travel support device of the present disclosure is configured as follows.

A travel support device including:
  a target speed setting unit to output a target speed of a
    merging vehicle that is going to change lanes to a
    merging destination lane;
  a speed control unit to acquire a current speed of the
    merging vehicle and calculate a control amount that
    matches the current speed with the target speed;
  a merging destination vehicle detecting unit to acquire a
    position and a speed of a merging destination vehicle
    that is a vehicle traveling in the merging destination
    lane;
  an inter-vehicle distance control unit to acquire a current
    position of the merging vehicle and calculate a control
    amount that maintains an inter-vehicle distance
    between the merging vehicle and the merging destina-
    tion vehicle by using a position of the merging vehicle,
    a position of the merging destination vehicle, and a
    speed of the merging destination vehicle;
  a merging destination vehicle predicting unit to acquire a
    speed of the merging vehicle and calculate a predicted position of the merging destination vehicle in a case where it is assumed that the current speed of the merging vehicle has reached the target speed by using the speed of the merging vehicle, the target speed, the position of the merging destination vehicle, and the speed of the merging destination vehicle; and a control switching unit to output one of the control amount by the speed control unit and the control amount by the inter-vehicle distance control unit by using the speed of the merging vehicle, the speed of the merging destination vehicle, and the predicted position of the merging destination vehicle.

As a result, the present disclosure has an effect of being able to provide a travel support device capable of preventing a merging vehicle from obstructing a traffic flow at a merging destination.

The travel support method of the present disclosure is configured as follows.

A travel support method including:

a target speed setting step of outputting, by a target speed setting unit, a target speed of a merging vehicle that is going to change lanes to a merging destination lane;

a speed control step of acquiring, by a speed control unit, a current speed of the merging vehicle and calculating a control amount that matches the current speed with the target speed;

a merging destination vehicle detecting step of acquiring, by a merging destination vehicle detecting unit, a position and a speed of a merging destination vehicle that is a vehicle traveling in the merging destination lane;

an inter-vehicle distance control step of acquiring, by an inter-vehicle distance control unit, a current position of the merging vehicle and calculating a control amount that maintains an inter-vehicle distance between the merging vehicle and the merging destination vehicle by using a position of the merging vehicle, a position of the merging destination vehicle, and a speed of the merging destination vehicle;

a merging destination vehicle predicting step of acquiring, by a merging destination vehicle predicting unit, a speed of the merging vehicle and calculating a predicted position of the merging destination vehicle in a case where it is assumed that the current speed of the merging vehicle has reached the target speed by using the speed of the merging vehicle, the target speed, the position of the merging destination vehicle, and the speed of the merging destination vehicle; and a control switching step of outputting, by a control switching unit, one of the control amount by the speed control unit and the control amount by the inter-vehicle distance control unit by using the speed of the merging vehicle, the speed of the merging destination vehicle, and the predicted position of the merging destination vehicle.

As a result, the present disclosure has an effect of being able to provide a travel support method capable of preventing a merging vehicle from obstructing a traffic flow at a merging destination.

The program of the present disclosure is configured as follows.

A program causing a computer to operate as a travel support device including:

a target speed setting unit to output a target speed of a merging vehicle that is going to change lanes to a merging destination lane;

a speed control unit to acquire a current speed of the merging vehicle and calculate a control amount that matches the current speed with the target speed;

a merging destination vehicle detecting unit to acquire a position and a speed of a merging destination vehicle that is a vehicle traveling in the merging destination lane;

an inter-vehicle distance control unit to acquire a current position of the merging vehicle and calculate a control amount that maintains an inter-vehicle distance between the merging vehicle and the merging destination vehicle by using a position of the merging vehicle, a position of the merging destination vehicle, and a speed of the merging destination vehicle;

a merging destination vehicle predicting unit to acquire a speed of the merging vehicle and calculate a predicted position of the merging destination vehicle in a case where it is assumed that the current speed of the merging vehicle has reached the target speed by using the speed of the merging vehicle, the target speed, the position of the merging destination vehicle, and the speed of the merging destination vehicle; and a control switching unit to output one of the control amount by the speed control unit and the control amount by the inter-vehicle distance control unit by using the speed of the merging vehicle, the speed of the merging destination vehicle, and the predicted position of the merging destination vehicle.

As a result, the present disclosure has an effect of being able to provide a program causing a computer to execute as a travel support device capable of preventing a merging vehicle from obstructing a traffic flow at a merging destination.

The travel support device of the present disclosure is further configured as follows.

The control switching unit causes:

the control amount of the speed control unit to be output when the predicted position of the merging destination vehicle is not present within a predetermined range ahead of or behind the predicted position of the merging vehicle; and the control amount of the inter-vehicle distance control unit to be output when the predicted position of the merging destination vehicle is present within a predetermined range ahead of or behind the predicted position of the merging vehicle.

Accordingly, the present disclosure has an effect of being able to provide a travel support device that outputs a control amount that prevents a merging vehicle from excessively approaching a merging destination vehicle.

Furthermore, the present disclosure exhibits the same effect as the above effect by applying the above configuration to the above travel support method or the above program.

The travel support device of the present disclosure is further configured as follows.

The predicted position of the merging destination vehicle predicted by the merging destination vehicle predicting unit is indicated by using an inter-vehicle distance between the merging vehicle and the merging destination vehicle at a target time at which the merging vehicle is supposed to accelerate within a range of a predetermined acceleration limit and reach the target speed.

As a result, the present disclosure is based on a target time at which a merging vehicle reaches a target speed without performing sudden acceleration or sudden deceleration, and has an effect of being able to provide a travel support device that outputs a control amount natural for the merging vehicle and an occupant of the merging vehicle.

Furthermore, the present disclosure exhibits the same effect as the above effect by applying the above configuration to the above travel support method or the above program.

The travel support device of the present disclosure is further configured as follows.

The target speed is a legal speed limit of the merging destination lane.

Accordingly, the present disclosure has an effect of being able to provide a travel support device capable of outputting a control amount so as not to exceed a speed limit in a merging destination lane where the speed limit is defined by law, for example.

Furthermore, the present disclosure exhibits the same effect as the above effect by applying the above configuration to the above travel support method or the above program.

The travel support device of the present disclosure is further configured as follows.

The inter-vehicle distance control unit:

includes a first inter-vehicle distance control unit to calculate a control amount that maintains an inter-vehicle distance between the merging vehicle and the merging destination vehicle ahead of the merging vehicle; and a second inter-vehicle distance control unit to calculate a control amount that maintains an inter-vehicle distance between the merging vehicle and the merging destination vehicle behind the merging vehicle; and outputs a control amount selected from among the control amount of the first inter-vehicle distance control unit and the control amount of the second inter-vehicle distance control unit on a basis of a predetermined condition related to magnitudes of control amounts.

As a result, the present disclosure has an effect of being able to provide a travel support device that selects and outputs a control amount that enables more efficient merging flow of traffic between merging destination vehicles from control amounts that allow merging ahead of or behind the merging destination vehicle.

Furthermore, the present disclosure exhibits the same effect as the above effect by applying the above configuration to the above travel support method or the above program.

The travel support device of the present disclosure is further configured as follows.

The inter-vehicle distance control unit:

includes the first inter-vehicle distance control unit and the second inter-vehicle distance control unit for each of a plurality of merging destination vehicles; and outputs a control amount selected from among a control amount calculated from each of a plurality of first inter-vehicle distance control units and a control amount calculated from each of a plurality of second inter-vehicle distance control units on a basis of a predetermined condition related to magnitudes of control amounts.

As a result, the present disclosure has an effect of being able to provide a travel support device that outputs a control amount that enables more efficient merging flow of traffic between merging destination vehicles from among control amounts that allow merging of traffic between a plurality of merging destination vehicles.

Furthermore, the present disclosure exhibits the same effect as the above effect by applying the above configuration to the above travel support method or the above program.

The travel support device of the present disclosure is further configured as follows.

The control amount output by the speed control unit and the control amount output by the inter-vehicle distance control unit are acceleration commands, and the control switching unit outputs the acceleration command to a drive and brake control device that controls drive and brake of the merging vehicle.

As a result, the present disclosure has an effect of being able to provide a travel support device capable of outputting a control amount for causing a merging vehicle to reach a target speed by, for example, suppressing deceleration of the merging vehicle in order to avoid the merging destination vehicle when the merging vehicle changes lanes to the merging destination lane.

Furthermore, the present disclosure exhibits the same effect as the above effect by applying the above configuration to the above travel support method or the above program.

Second Embodiment

In a second embodiment, a detailed configuration of the travel support device 100 according to the second embodiment will be described using a mode in which the travel support device 100 is mounted on a merging vehicle.

Figure 3:
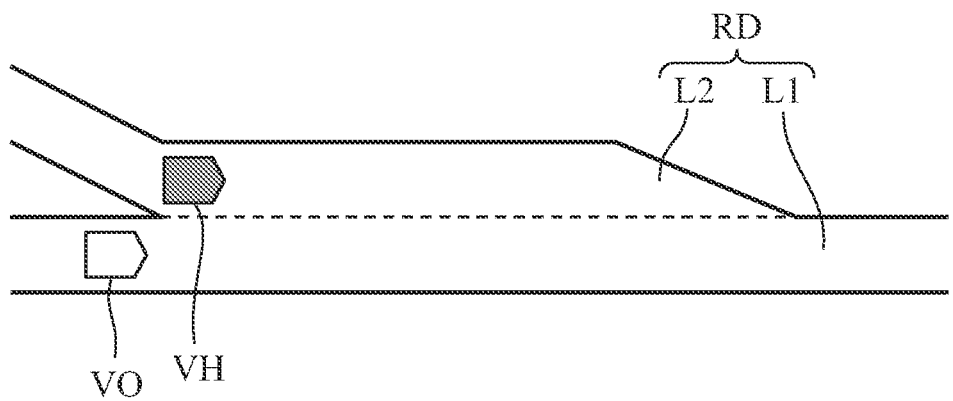
FIG. 3 is a diagram illustrating an example of a scene where the travel support device of the present disclosure is used.

FIG. 3 is a diagram illustrating an example of a scene where the travel support device 100 of the present disclosure is used.

FIG. 3 illustrates a road RD such as a merging lane L2 and a merging destination lane (L1), a merging vehicle VH, and a merging destination vehicle VO in a scene where the travel support device 100 of the present disclosure is used.

FIG. 3 is a diagram of a merging portion of the road RD as viewed from above.

The road RD is, for example, an expressway. When the road RD is an expressway, the merging destination lane is also referred to as a "main lane".

At a merging portion of the merging lane and the merging destination lane, the main lane L1 and the merging lane L2 are connected.

Note that in FIG. 3, the main lane L1 and the merging lane L2 are parallel to each other at a merging portion (a region of a plurality of lanes in contact with each other as indicated by a broken line), but they are not necessarily parallel to each other.

Figure 4:
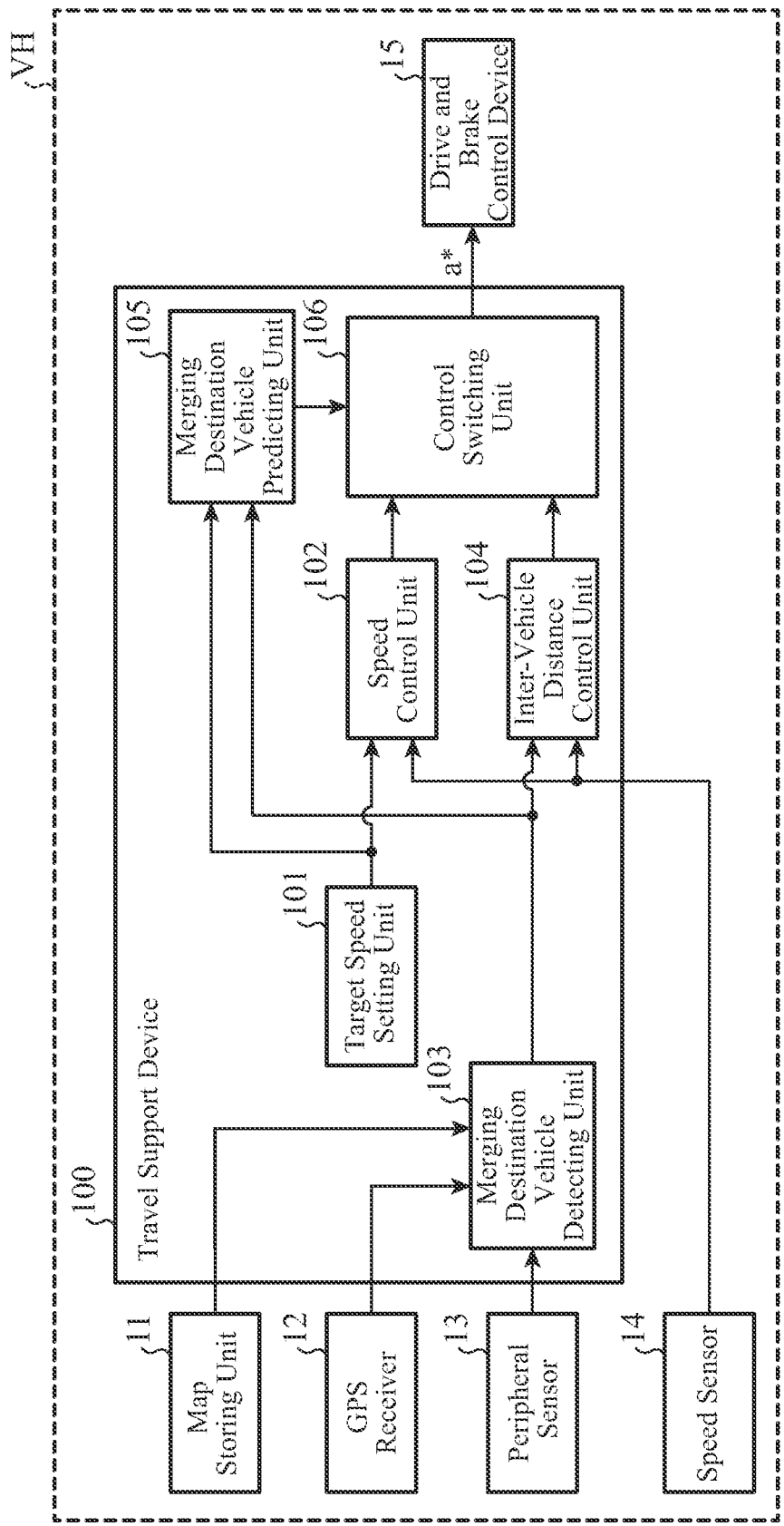
FIG. 4 is a diagram illustrating a related device including a travel support device according to a second embodiment mounted on a merging vehicle in FIG. 3, and a configuration example thereof.

When the travel support device 100 of the present disclosure is mounted as illustrated in FIG. 4, the merging vehicle is also referred to as "host vehicle". In the description, in addition to the term "merging vehicle", the term "host vehicle" is also used as appropriate.

In FIG. 3, the host vehicle VH is a vehicle traveling in the merging lane L2 of the road RD.

In FIG. 3, the host vehicle VH is a vehicle that changes lanes from the merging lane L2 to the main lane L1 in the merging section.

The merging destination vehicle VO is a vehicle traveling in a merging destination lane.

When the merging destination vehicle VO is a vehicle traveling in the "main lane", the merging destination vehicle VO is also referred to as a "main lane vehicle". In the description, in addition to the terms "merging destination lane" and "merging destination vehicle", the terms "main lane" and "main lane vehicle" are also used as appropriate.

In FIG. 3, the main lane vehicle VO is a vehicle traveling on the main lane L1 of the road RD.

FIG. 4 is a diagram illustrating a related device including the travel support device 100 according to the second embodiment mounted on the merging vehicle of FIG. 3 and a configuration example thereof.

In FIG. 4, a configuration including the travel support device 100 mounted on the host vehicle VH is expressed in the form of functional blocks.

The host vehicle VH includes a map storing unit 11, a global positioning system (GPS) receiver 12, a peripheral sensor 13, a speed sensor 14, a drive and brake control device 15, and the travel support device 100.

The map storing unit 11 stores map information.

The map information includes information on the main lane L1 and the merging lane L2 of the road RD.

The GPS receiver 12 receives a GPS signal from a GPS satellite (not illustrated).

The peripheral sensor 13 detects an object present around the host vehicle VH and detects the position and speed of the object.

The speed sensor 14 detects the speed of the host vehicle VH.

The travel support device 100 includes a target speed setting unit 101, a speed control unit 102, a merging destination vehicle detecting unit 103, an inter-vehicle distance control unit 104, a merging destination vehicle predicting unit 105, and a control switching unit 106.

The travel support device 100 acquires map information from the map storing unit 11, and acquires the position of the host vehicle VH, that is, the position of the host vehicle from the GPS receiver 12.

In addition, the travel support device 100 acquires position information of peripheral objects of the host vehicle VH and speed information of the peripheral objects from the peripheral sensor 13.

The travel support device 100 acquires speed information of the host vehicle VH from the speed sensor 14.

The travel support device 100 calculates an acceleration command a* as a control amount for supporting merging into the main lane L1, and outputs the acceleration command a* to the drive and brake control device 15.

The drive and brake control device 15 controls a drive device and a brake device (not illustrated) of the host vehicle VH on the basis of the acceleration command a* from the travel support device 100.

As a result, acceleration and deceleration of the host vehicle VH is controlled.

Hereinafter, each of the target speed setting unit 101, the speed control unit 102, the merging destination vehicle detecting unit 103, the inter-vehicle distance control unit 104, the merging destination vehicle predicting unit 105, and the control switching unit 106, which are functional blocks of the travel support device 100, will be described in detail.

The target speed setting unit 101 has a function similar to that of the target speed setting unit 101 described above.

More specifically, the target speed setting unit 101 sets a target speed $V_{tgt}$ when the host vehicle VH merges into the main lane L1. The target speed $V_{tgt}$ is a speed limit of the main lane L1 acquired from the map information.

The speed control unit 102 has a function similar to that of the speed control unit 102 described above.

More specifically, the speed control unit 102 calculates the control amount so that the speed of the host vehicle VH matches the target speed $V_{tgt}$. For example, when the target speed is $V_{tgt}$ and the speed of the host vehicle VH is V, a control amount $a_{spd}^*$ can be calculated as follows.

Equation (1) is PI control using a proportional gain $K_{sp}$ and an integral gain $K_{si}$.

$$a_{spd}^* K_{sp}(V_{tgt}-V)+K_{si}\int(V_{tgt}-V)dt \quad (1)$$

The merging destination vehicle detecting unit 103 has a function similar to that of the merging destination vehicle detecting unit 103 described above.

More specifically, the merging destination vehicle detecting unit 103 acquires position information of peripheral objects and speed information of peripheral objects from the peripheral sensor 13.

In addition, the merging destination vehicle detecting unit 103 acquires map information from the map storing unit 11.

The merging destination vehicle detecting unit 103 acquires the position information of the host vehicle VH from the GPS receiver 12.

The merging destination vehicle detecting unit 103 detects the position of the main lane vehicle VO and the speed of the main lane vehicle VO on the basis of the acquired position information of the peripheral objects, the acquired speed information of the peripheral objects, the map information, and the position information of the host vehicle VH.

More specifically, the merging destination vehicle detecting unit 103 collates position information of peripheral objects detected by the peripheral sensor 13 with map information, and specifies an object present on the main lane L1 from among the detected peripheral objects.

In the example of FIG. 3, the main lane vehicle VO is specified as an object present on the main lane L1. Then, the merging destination vehicle detecting unit 103 outputs the position information of the main lane vehicle VO and the speed information of the main lane vehicle VO to the inter-vehicle distance control unit 104.

In the example of FIG. 3, one main lane vehicle VO is illustrated, but in a case where there are a plurality of main lane vehicles VO, information of the plurality of main lane vehicles VO is output to the inter-vehicle distance control unit 104.

Note that in the description, the merging destination vehicle detecting unit 103 uses the map information, but may not use the map information. For example, the merging destination vehicle detecting unit 103 may specify an object whose lateral position of a peripheral object is within a predetermined range as an object present on the main lane L1.

The inter-vehicle distance control unit 104 has a function similar to that of the inter-vehicle distance control unit 104 described above.

More specifically, the inter-vehicle distance control unit 104 calculates a control amount for maintaining the inter-vehicle distance between the host vehicle VH and the main lane vehicle VO on the basis of the position information of the main lane vehicle VO and the speed information of the main lane vehicle VO.

Figure 5:
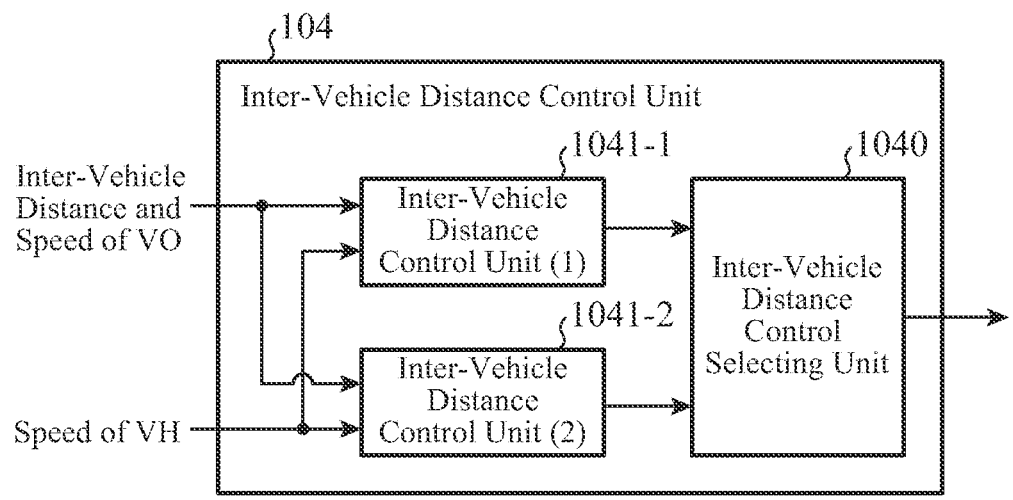
FIG. 5 is a diagram illustrating a configuration example of an inter-vehicle distance control unit of the travel support device according to the second embodiment.

FIG. 5 is a diagram illustrating a configuration example of the inter-vehicle distance control unit 104 of the travel support device 100 according to the second embodiment. In FIG. 5, the internal configuration of the inter-vehicle distance control unit 104 is expressed in the form of functional blocks.

The inter-vehicle distance control unit 104 illustrated in FIG. 5 includes two control blocks of an inter-vehicle distance control unit (1) 1041-1 and an inter-vehicle distance control unit (2) 1041-2 for the main lane vehicle VO, and an inter-vehicle distance control selecting unit 1040 that selects one output from these outputs.

This means that there are two target positions in front of and behind the main lane vehicle VO, and there is a control block of the inter-vehicle distance for each target position.

FIG. 5 illustrates a case where there is one main lane vehicle VO, but in a case where there are N main lane vehicles, 2×N control blocks are provided.

That is, the inter-vehicle distance control unit 104 includes an inter-vehicle distance control unit (1), an inter-vehicle distance control unit (2), . . . , and an inter-vehicle distance control unit (2×N).

An inter-vehicle distance between the host vehicle VH and the main lane vehicle VO is defined as d.

"d" is defined by the distance between the centers of the vehicles, and the front is defined as positive and the rear is defined as negative when viewed from the host vehicle VH.

Next, the target inter-vehicle distance $d_m^*$ with respect to the main lane vehicle VO is set as in the following Equation (2).

In Equation (2), m=1 indicates a case of merging into traffic ahead of the main lane vehicle VO.

Since the main lane vehicle VO positions itself behind the host vehicle VH, the main lane vehicle VO is defined by a negative value.

m=2 indicates a case of merging into traffic behind the main lane vehicle VO.

Since the main lane vehicle VO positions itself ahead of the host vehicle VH, the main lane vehicle VO is defined by a positive value.

In Equation (2), "$T_{hw\_f}$" and "$T_{hw\_r}$" are the inter-vehicle times (proportional coefficients with respect to the speed). Further, in Equation (2), "$D_{0\_f}$" and "$D_{0\_r}$" are the stopping distances (offsets).

This will be described.

The inter-vehicle distance is preferably a large value depending on the speed. Therefore, the target inter-vehicle distance $d_m^*$ is defined as a value that increases depending on the speed of the host vehicle VH using the inter-vehicle times "$T_{hw\_f}$" and "$T_{hw\_r}$" and the stopping distances "$D_{0\_f}$" and "$D_{0\_r}$". The stopping distance indicates an inter-vehicle distance considered to be required for stopping when a situation occurs in which the host vehicle VH has to stop when merging.

In addition, the target inter-vehicle distance $d_m^*$ is defined as different constants in two cases so as not to obstruct the travel of the main lane vehicle VO by increasing the target inter-vehicle distance in the "case of merging into traffic ahead of the main lane vehicle VO" as compared with the "case of merging into traffic behind the main lane vehicle VO". That is, the inter-vehicle time "$T_{hw\_f}$" and the inter-vehicle time "$T_{hw\_r}$" can be set to different values, and the stopping distance "$D_{0\_f}$" and the stopping distance "$D_{0\_r}$" can be set to different values.

$$d_m^* = \begin{cases} -(T_{hw\_r}V + D_{0\_r}) & (m=1) \\ T_{hw\_f}V + D_{0\_f} & (m=2) \end{cases} \quad (2)$$

The control amount $a_{dist,\,m}^*$ for causing the inter-vehicle distance d between the host vehicle VH and the main lane vehicle VO to reach the target inter-vehicle distance $d_m^*$ and causing the speed V of the host vehicle VH to reach the speed $V_o$ of the main lane vehicle VO is calculated as in Expression (3).

The control amount of Expression (3) is calculated in two ways for each of the case of m=1 and the case of m=2.

$$a_{dist,m}^* = K_{dp}(d - d_m^*) + K_{dd}(V_o - V) \quad (3)$$

The inter-vehicle distance control selecting unit 1040 selects one output from the output of the inter-vehicle distance control unit (1) 1041-1 and the output of the inter-vehicle distance control unit (2) 1041-2, which are two control blocks.

For example, an output having the smallest magnitude of the control amount $a_{dist,m}^*$ is selected as the control amount $a_{dist}^*$ of the inter-vehicle distance control unit 104.

The merging destination vehicle predicting unit 105 has a function similar to that of the merging destination vehicle predicting unit 105 described above.

More specifically, the merging destination vehicle predicting unit 105 calculates the predicted position $d_{est}$ of the main lane vehicle VO at the time when the host vehicle VH has reached the target speed (thereafter, target time) on the basis of the target speed $V_{tgt}$, the position information d of the main lane vehicle VO, and the speed information $V_o$ of the main lane vehicle VO.

Assuming that the traveling position of the host vehicle VH at the time t is x, the predicted value $x_{est}$ and the arrival time $T_{est}$ of the traveling position at the target time at which the host vehicle VH reaches the target speed $V_{tgt}$ by the constant acceleration motion of the acceleration $A_{accl}$ can be calculated by Equations (4) and (5).

$$x_{est} = x + \frac{V_{tgt}^2 - V^2}{2A_{accl}} \quad (4)$$

$$T_{est} = \frac{V_{tgt} - V}{A_{accl}} \quad (5)$$

Assuming that the traveling position of the main lane vehicle VO at the time t is $x_o$, the predicted value $x_{est,\,o}$ of the traveling position at the target time can be calculated by Equation (6).

$$x_{est,o} = x_o + V_o T_{est} \quad (6)$$

From the above, the predicted position $d_{est}$ of the main lane vehicle VO at the target time can be calculated as in Expression (7) using the current inter-vehicle distance d.

$$d_{est} = x_{est,o} - x_{est} = d + V_o T_{est} - \frac{V_{tgt}^2 - V^2}{2A_{accl}} \quad (7)$$

The control switching unit 106 has a function similar to that of the control switching unit 106 described above.

More specifically, the control switching unit 106 selects the output of the speed control unit 102 or the output of the inter-vehicle distance control unit 104 on the basis of the predicted position d est of the main lane vehicle VO, the speed information of the main lane vehicle VO, and the speed information of the host vehicle VH.

The conditions for determining that the lane change is possible for the predicted position d est at the target time are expressed by Equations (8), (9), and (10).

This condition means that the main lane vehicle VO is sufficiently separated forward or backward by the target inter-vehicle distance $d_m^*$ or more during the time $T_{lc}$ required for lane change from the target time when the host vehicle VH has reached the target speed $V_{tgt}$.

$$d_{est} \le d_{est\_r}, d_{est} \ge d_{est\_f} \tag{8}$$

$$d_{est\_r} = \min(-(T_{hw\_r}V + D_{0\_r}) - T_{lc}(V_o - V_{tgt}), -(T_{hw\_r}V + D_{0\_r})) \tag{9}$$

$$d_{est\_f} = \max(+(T_{hw\_r}V + D_{0\_f}) - T_{lc}(V_o - V_{tgt}), -(T_{hw\_f}V + D_{0\_r})) \tag{10}$$

When the conditional equations represented by Equations (8), (9), and (10) are satisfied for the main lane vehicle VO, the control switching unit 106 determines that "the lane change is possible at the target time", selects the control amount $a_{spd}*$ of the speed control unit 102, and outputs the selected control amount $a_{spd}*$ as the acceleration command $a*$.

When the conditional equations shown in Equations (8), (9), and (10) are not satisfied for the main lane vehicle VO, the control switching unit 106 determines that "the lane change is impossible at the target time".

Then, in order to avoid the main lane vehicle VO, the control amount $a_{dist}*$ of the inter-vehicle distance control unit 104 is selected and output as the acceleration command $a*$.

Figure 6:
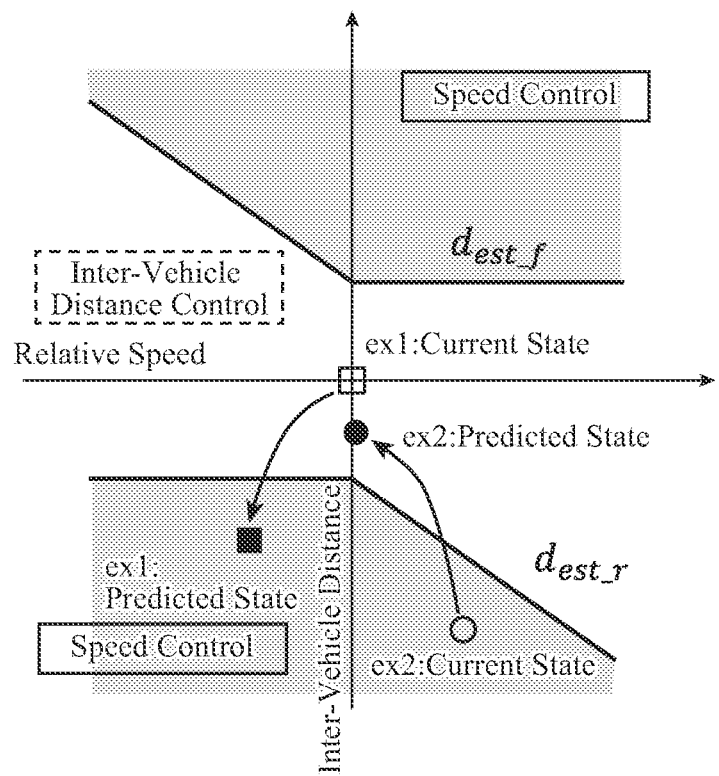
FIG. 6 is a diagram for explaining an operation of a control switching unit in the travel support device according to the second embodiment.

FIG. 6 is a diagram for explaining the operation of the control switching unit 106 in the travel support device 100 according to the second embodiment.

The operation of the lane change determination using Equations (8), (9), and (10) will be described with reference to FIG. 6.

In the drawing, the horizontal axis indicates the relative speed, and the right side indicates that the main lane vehicle VO is faster than the host vehicle VH.

In the drawing, the vertical axis indicates the inter-vehicle distance, and the upper side means traveling ahead of the host vehicle VH.

Further, in the drawing, a gray area indicates an area in which it is determined that "the lane change at the target time is possible" by the conditional equation of Equation (8).

FIG. 6 illustrates Example 1 in which one main lane vehicle VO travels right beside and Example 2 in which one main lane vehicle VO travels behind.

In Example 1 of FIG. 6, the main lane vehicle VO is traveling right beside the host vehicle VH at the same speed as the host vehicle VH, and this state ($V_o$–V, d) is indicated by □ (white square symbol).

A predicted position ($V_o$-$V_{tgt}$, $d_{est}$) when the host vehicle VH has reached the target speed $V_{tgt}$ is indicated by ■ (black square symbol).

As the host vehicle VH accelerates, the relative speed ($V_o$-$V_{tgt}$) becomes a negative value, and the predicted position d est of the main lane vehicle VO also moves backward.

At this time, since the predicted state is present in the gray area, it is determined that the lane change is possible.

As a result, the control switching unit 106 selects the speed control unit 102.

In Example 2 of FIG. 6, the main lane vehicle VO is traveling behind the host vehicle VH at the same speed as the target speed V*.

This state ($V_o$-V, d) is indicated by ○ (white circle symbol). A predicted position when the host vehicle VH has reached the target speed $V_{tgt}$ is indicated by ● (black circle symbol).

The relative speed ($V_o$-$V_{tgt}$) becomes zero due to the acceleration of the host vehicle VH, but the predicted position $d_{est}$ of the main lane vehicle VO approaches immediately behind the host vehicle VH.

At this time, since the predicted state is not present in the gray area, it is determined that the lane change is impossible.

As a result, the control switching unit 106 selects the inter-vehicle distance control unit 104.

Figure 7:
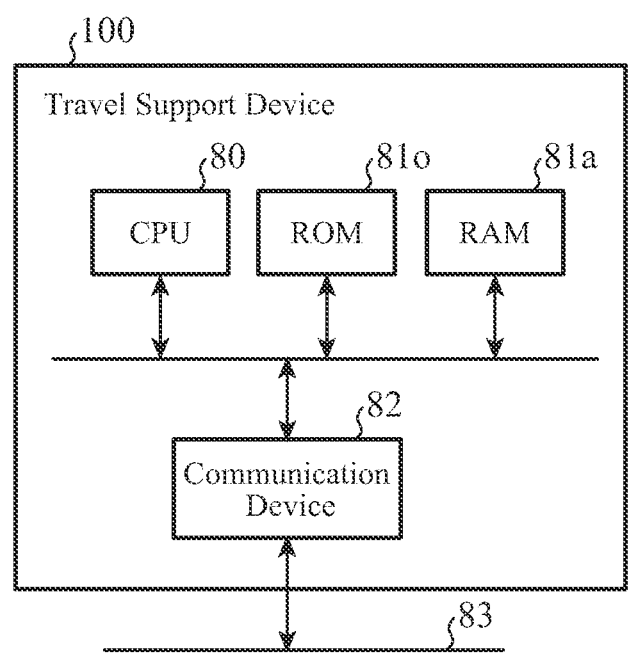
FIG. 7 is a diagram illustrating an example of a hardware configuration that implements each function of the travel support device in FIG. 4.

FIG. 7 is a diagram illustrating an example of a hardware configuration that implements each function of the travel support device 100 in FIG. 4.

Here, each function of the travel support device 100 of the first embodiment is implemented by a processing circuit.

The travel support device 100 includes an arithmetic processing device 80, a plurality of storage devices 81, a communication device 82, and an in-vehicle network 83.

For example, a central processing unit (CPU) is used as the arithmetic processing device 80.

The plurality of storage devices 81 transmit and receive data to and from the arithmetic processing device 80, and store data.

The communication device 82 performs data communication with the in-vehicle network 83.

The communication device 82 communicates with the map storing unit 11, the GPS receiver 12, and the peripheral sensor 13 as external devices via the in-vehicle network 83.

Furthermore, the arithmetic processing device 80 may include, for example, an application specific integrated circuit (ASIC), an integrated circuit (IC), a digital signal processor (DSP), a field programmable gate array (FPGA), various logic circuits, and various signal processing circuits.

Furthermore, by providing a plurality of arithmetic processing devices 80 of the same type or different types, each processing may be shared and executed by a plurality of arithmetic processing devices.

As the plurality of storage devices 81, for example, a random access memory (RAM) configured to be able to read and write data from and to the arithmetic processing device 80 and a read only memory (ROM) configured to be able to read data from the arithmetic processing device 80 are provided.

Each function of the travel support device 100 is implemented by the arithmetic processing device 80 executing software or a program stored in the plurality of storage devices 81 and cooperating with other hardware of the travel support device 100, for example, the plurality of storage devices 81 and the communication device 82. Note that the setting data used by each function of the travel support device 100 is stored in the plurality of storage devices 81 as a part of software or a program.

Processing of the travel support device 100 will be described.

The processing of the travel support device 100 described above will be described in detail.

When the processing is started, the travel support device 100 executes the target speed setting processing (step ST110). Specifically, the target speed setting unit 101 in the travel support device 100 outputs the target speed of the merging vehicle VH that is going to change lanes to the merging destination lane. The target speed setting unit 101 acquires, for example, a legal speed limit included in the map information and sets the target speed.

The travel support device 100 executes the speed control processing (step ST120).

Specifically, the speed control unit 102 in the travel support device 100 acquires the current speed of the merging vehicle VH and calculates a control amount that matches the current speed with the target speed. The speed control unit 102 acquires the current speed of the merging vehicle VH using the signal from the speed sensor 14.

The travel support device 100 executes the merging destination vehicle detection processing (step ST130).

Specifically, the merging destination vehicle detecting unit 103 in the travel support device 100 acquires the position and speed of the merging destination vehicle VO that is a vehicle traveling in the merging destination lane. The merging destination vehicle detecting unit 103 acquires the position and speed of the merging destination vehicle VO using the signal from the peripheral sensor 13, and outputs the position information and the speed information.

The travel support device 100 executes the inter-vehicle distance control processing (step ST140).

Specifically, the inter-vehicle distance control unit 104 in the travel support device 100 acquires the current position of the merging vehicle VH, and calculates a control amount that maintains an inter-vehicle distance between the merging vehicle VH and the merging destination vehicle VO using the position of the merging vehicle VH, the position of the merging destination vehicle VO, and the speed of the merging destination vehicle VO. The inter-vehicle distance control unit 104 acquires the current position of the merging vehicle VH using the signal from the GPS receiver 12. In addition, the inter-vehicle distance control unit 104 acquires the position of the merging destination vehicle VO and the speed of the merging destination vehicle VO from the merging destination vehicle detecting unit 103.

The travel support device 100 executes the merging destination vehicle prediction processing (step ST150).

Specifically, the merging destination vehicle predicting unit 105 in the travel support device 100 acquires the speed of the merging vehicle VH, and calculates the predicted position of the merging destination vehicle VO in a case where it is assumed that the current speed of the merging vehicle VH has reached the target speed using the speed of the merging vehicle VH, the target speed, the position of the merging destination vehicle VO, and the speed of the merging destination vehicle VO. The travel support device 100 acquires the speed of the merging vehicle VH using the signal from the speed sensor 14. The travel support device 100 acquires the target speed from the target speed setting unit 101. The travel support device 100 acquires the position of the merging destination vehicle VO and the speed of the merging destination vehicle VO from the merging destination vehicle detecting unit 103.

The travel support device 100 executes the control switching processing (step ST160).

Specifically, the control switching unit 106 in the travel support device 100 outputs one of the control amount by the speed control unit 102 and the control amount by the inter-vehicle distance control unit 104 using the speed of the merging vehicle VH, the speed of the merging destination vehicle VO, and the predicted position of the merging destination vehicle VO. The control switching unit 106 acquires the speed of the merging vehicle VH from the merging destination vehicle predicting unit 105 or the speed sensor. The control switching unit 106 acquires the speed of the merging destination vehicle VO from the merging destination vehicle detecting unit 103 or via the merging destination vehicle predicting unit 105. The predicted position of the merging destination vehicle VO is acquired from the merging destination vehicle predicting unit 105.

After executing the processing of step ST160, the travel support device 100 terminates the processing.

Alternatively, the travel support device 100 repeats the processing from ST110.

Note that, although the case where there is one main lane vehicle VO has been described, a plurality of main lane vehicles VO may be detected and used for the processing. When there are N main lane vehicles VO, information on the N main lane vehicles VO is output to the inter-vehicle distance control unit 104. Then, the inter-vehicle distance control unit 104 may include 2×N control blocks for the N main lane vehicles VO, and the inter-vehicle distance control selecting unit 1040 may select the output having the smallest control amount from the outputs of the 2×N control blocks.

The travel support device 100 described above includes, as functional blocks, a target speed setting unit 101, a speed control unit 102, a merging destination vehicle detecting unit 103, an inter-vehicle distance control unit 104, a merging destination vehicle predicting unit 105, and a control switching unit 106.

The target speed setting unit 101 determines the target speed on the basis of the map information.

The speed control unit 102 calculates a control amount on the basis of the target speed and the speed information of the host vehicle VH.

The merging destination vehicle detecting unit 103 calculates the position information of the main lane vehicle and the speed information of the main lane vehicle on the basis of the map information, the host vehicle position information acquired from the GPS receiver 12, and the position information of the peripheral objects and the speed information of the peripheral objects acquired from the peripheral sensor 13.

The inter-vehicle distance control unit 104 calculates the control amount on the basis of the speed information of the host vehicle, the position information of the main lane vehicle, and the speed information of the main lane vehicle.

The merging destination vehicle predicting unit 105 calculates the predicted position of the main lane vehicle on the basis of the target speed, the speed information of the host vehicle, the position information of the main lane vehicle, and the speed information of the main lane vehicle.

The control switching unit 106 calculates an acceleration command for controlling the host vehicle VH on the basis of the predicted position information of the main lane vehicle, the control amount of the speed control unit 102, and the control amount of the inter-vehicle distance control unit 104.

In the present embodiment, the merging destination vehicle predicting unit 105 determines whether or not a lane change can be made on the basis of the predicted position of the main lane vehicle VO at the target time when the host vehicle VH has reached the target speed, and selects one of speed control and inter-vehicle distance control.

As a result, when the host vehicle VH can avoid the main lane vehicle VO by accelerating to the target speed even when the main lane vehicle VO travels at the position that prevents the lane change at the current time, the speed control to accelerate to the target speed is selected.

Therefore, this makes it possible to suppress deceleration to avoid the main lane vehicle VO, and the merging vehicle VH can reach the target speed and change the lanes.

The travel support device of the present disclosure is further configured as follows.

The control switching unit causes:
  the control amount of the speed control unit to be output when the predicted position of the merging destination vehicle is not present within a predetermined range ahead of or behind the predicted position of the merging vehicle; and
  the control amount of the inter-vehicle distance control unit to be output when the predicted position of the merging destination vehicle is present within a predetermined range ahead of or behind the predicted position of the merging vehicle.

Accordingly, the present disclosure has an effect of being able to provide a travel support device that outputs a control amount that prevents a merging vehicle from excessively approaching a merging destination vehicle.

Furthermore, the present disclosure exhibits the same effect as the above effect by applying the above configuration to the above travel support method or the above program.

The travel support device of the present disclosure is further configured as follows.

The predicted position of the merging destination vehicle predicted by the merging destination vehicle predicting unit is indicated by using an inter-vehicle distance between the merging vehicle and the merging destination vehicle at a target time at which the merging vehicle is supposed to accelerate within a range of a predetermined acceleration limit and reach the target speed.

As a result, the present disclosure is based on a target time at which a merging vehicle reaches a target speed without performing sudden acceleration or sudden deceleration, and has an effect of being able to provide a travel support device that outputs a control amount natural for the merging vehicle and an occupant of the merging vehicle.

Furthermore, the present disclosure exhibits the same effect as the above effect by applying the above configuration to the above travel support method or the above program.

The travel support device of the present disclosure is further configured as follows.

The target speed is a legal speed limit of the merging destination lane.

Accordingly, the present disclosure has an effect of being able to provide a travel support device capable of outputting a control amount so as not to exceed a speed limit in a merging destination lane where the speed limit is defined by law, for example.

Furthermore, the present disclosure exhibits the same effect as the above effect by applying the above configuration to the above travel support method or the above program.

The travel support device of the present disclosure is further configured as follows.

The inter-vehicle distance control unit:

includes a first inter-vehicle distance control unit to calculate a control amount that maintains an inter-vehicle distance between the merging vehicle and the merging destination vehicle ahead of the merging vehicle; and a second inter-vehicle distance control unit to calculate a control amount that maintains an inter-vehicle distance between the merging vehicle and the merging destination vehicle behind the merging vehicle; and outputs a control amount selected from among the control amount of the first inter-vehicle distance control unit and the control amount of the second inter-vehicle distance control unit on a basis of a predetermined condition related to magnitudes of control amounts.

As a result, the present disclosure has an effect of being able to provide a travel support device that selects and outputs a control amount that enables more efficient merging flow of traffic between merging destination vehicles from control amounts that allow merging ahead of or behind the merging destination vehicle.

Furthermore, the present disclosure exhibits the same effect as the above effect by applying the above configuration to the above travel support method or the above program.

The travel support device of the present disclosure is further configured as follows.

The inter-vehicle distance control unit:

includes the first inter-vehicle distance control unit and the second inter-vehicle distance control unit for each of a plurality of merging destination vehicles; and outputs a control amount selected from among a control amount calculated from each of a plurality of first inter-vehicle distance control units and a control amount calculated from each of a plurality of second inter-vehicle distance control units on a basis of a predetermined condition related to magnitudes of control amounts.

As a result, the present disclosure has an effect of being able to provide a travel support device that outputs a control amount that enables more efficient merging flow of traffic between merging destination vehicles from among control amounts that allow merging of traffic between a plurality of merging destination vehicles.

Furthermore, the present disclosure exhibits the same effect as the above effect by applying the above configuration to the above travel support method or the above program.

The travel support device of the present disclosure is further configured as follows.

The control amount output by the speed control unit and the control amount output by the inter-vehicle distance control unit are acceleration commands, and the control switching unit outputs the acceleration command to a drive and brake control device that controls drive and brake of the merging vehicle.

As a result, the present disclosure has an effect of being able to provide a travel support device capable of outputting a control amount for causing a merging vehicle to reach a target speed by, for example, suppressing deceleration of the merging vehicle in order to avoid the merging destination vehicle when the merging vehicle changes lanes to the merging destination lane.

Furthermore, the present disclosure exhibits the same effect as the above effect by applying the above configuration to the above travel support method or the above program.

Third Embodiment

In the first embodiment and the second embodiment, the mode in which the control amount used in the control switching processing is the acceleration command has been described.

In a third embodiment, a mode in which the control amount used in the control switching processing is a speed command will be described.

Figure 8:
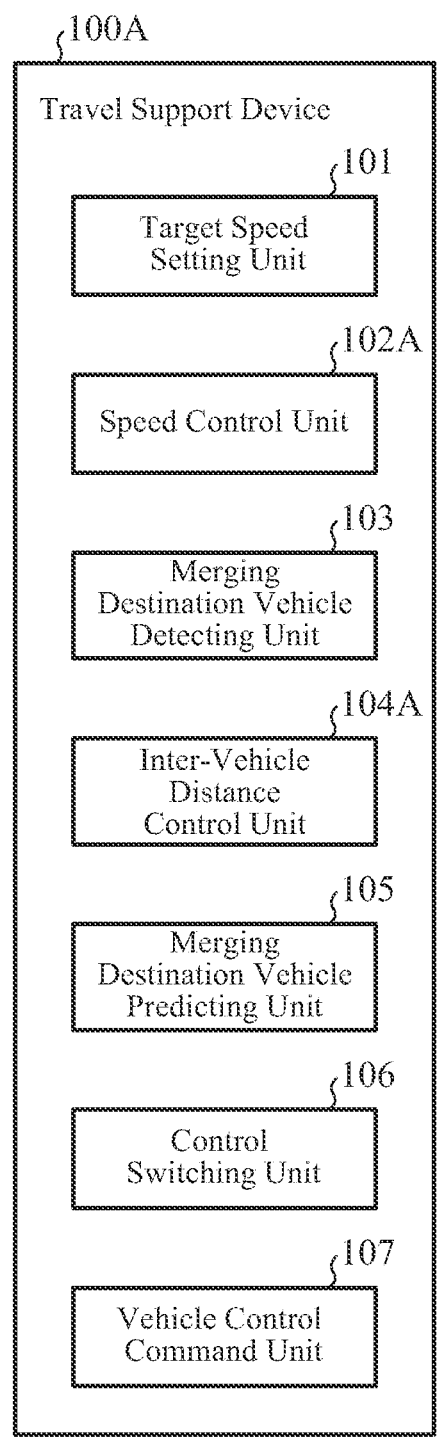
FIG. 8 is a diagram illustrating a configuration example of a travel support device according to a third embodiment.

FIG. 8 is a diagram illustrating a configuration example of a travel support device 100A according to the third embodiment.

In FIG. 8, the internal configuration of the travel support device 100A according to the third embodiment is expressed in the form of functional blocks. An example of a hardware configuration for implementing these functions will be described later in a fourth embodiment.

The travel support device 100A includes a target speed setting unit 101, a speed control unit 102A, a merging destination vehicle detecting unit 103, an inter-vehicle distance control unit 104A, a merging destination vehicle predicting unit 105, a control switching unit 106, and a vehicle control command unit 107.

The target speed setting unit 101 has a function similar to that of the configuration of the target speed setting unit 101 described above. The detailed description here is omitted.

Although the control amount output by the speed control unit 102 described above is the acceleration command, the speed control unit 102A is different from the speed control unit 102 in the following point.

The control amount output by the speed control unit 102A is a speed command.

The merging destination vehicle detecting unit 103 has a function similar to that of the configuration of the merging destination vehicle detecting unit 103 described above. The detailed description here is omitted.

Although the control amount output by the inter-vehicle distance control unit 104 described above is the acceleration command, the inter-vehicle distance control unit 104A is different from the inter-vehicle distance control unit 104 in the following point.

The control amount output by the inter-vehicle distance control unit 104A is a speed command.

The merging destination vehicle predicting unit 105 has a function similar to that of the configuration of the merging destination vehicle predicting unit 105 described above. The detailed description here is omitted.

The control switching unit 106 has a function similar to that of the configuration of the control switching unit 106 described above. The detailed description here is omitted.

The vehicle control command unit 107 calculates an acceleration command that causes a speed of the merging vehicle to reach a speed indicated by the control amount output by the control switching unit 106.

Processing of the travel support device 100A will be described.

Figure 9:
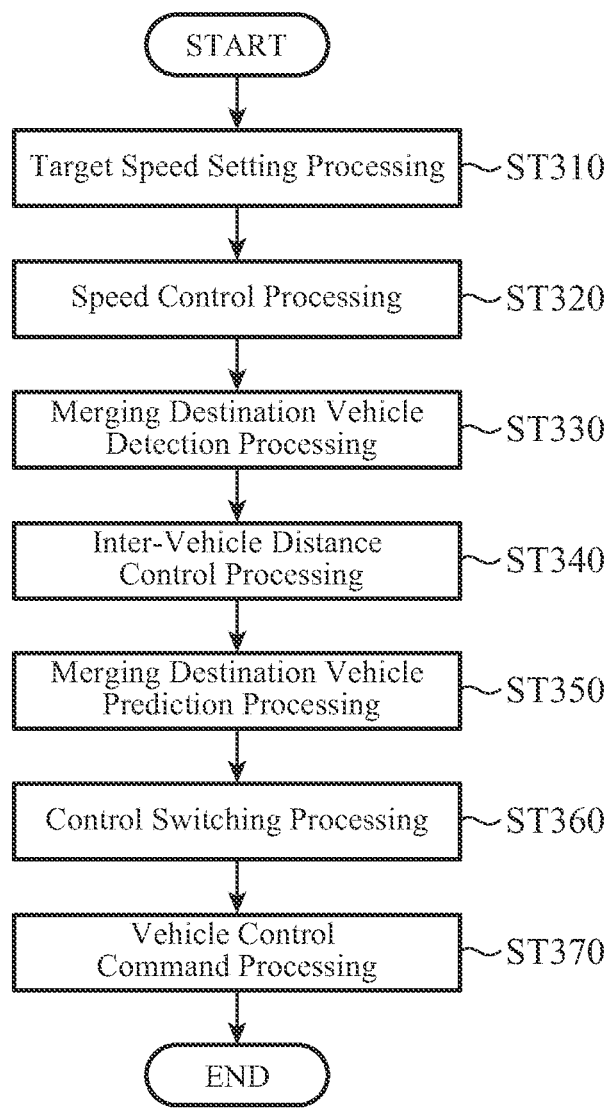
FIG. 9 is a flowchart illustrating an example of processing of the travel support device according to the third embodiment.

FIG. 9 is a flowchart illustrating an example of processing of the travel support device 100A according to the third embodiment.

When the processing is started, the travel support device 100A executes target speed setting processing (step ST310). Specifically, the target speed setting unit 101 in the travel support device 100A outputs the target speed of the merging vehicle VH that is going to change lanes to the merging destination lane.

The travel support device 100A executes speed control processing (step ST320).

Specifically, the speed control unit 102A in the travel support device 100A acquires the current speed of the merging vehicle VH and calculates a control amount that matches the current speed with the target speed. The speed control unit 102A calculates a speed command as a control amount.

The travel support device 100A executes merging destination vehicle detection processing (step ST330).

Specifically, the merging destination vehicle detecting unit 103 in the travel support device 100A acquires the position and speed of the merging destination vehicle VO that is a vehicle traveling in the merging destination lane.

The travel support device 100A executes inter-vehicle distance control processing (step ST340).

Specifically, the inter-vehicle distance control unit 104A in the travel support device 100A acquires the current position of the merging vehicle VH, and calculates a control amount that maintains the inter-vehicle distance between the merging vehicle VH and the merging destination vehicle VO using the position of the merging vehicle VH, the position of the merging destination vehicle VO, and the speed of the merging destination vehicle VO. The inter-vehicle distance control unit 104A calculates a speed command as a control amount.

The travel support device 100A executes merging destination vehicle prediction processing (step ST350).

Specifically, the merging destination vehicle predicting unit 105 in the travel support device 100A acquires the speed of the merging vehicle VH, and calculates the predicted position of the merging destination vehicle VO in a case where it is assumed that the current speed of the merging vehicle VH has reached the target speed using the speed of the merging vehicle VH, the target speed, the position of the merging destination vehicle VO, and the speed of the merging destination vehicle VO.

The travel support device 100A executes control switching processing (step ST360).

Specifically, the control switching unit 106 in the travel support device 100A outputs one of the control amount by the speed control unit 102A and the control amount by the inter-vehicle distance control unit 104A using the speed of the merging vehicle VH, the speed of the merging destination vehicle VO, and the predicted position of the merging destination vehicle VO.

The travel support device 100A executes vehicle control command processing (step ST370).

The vehicle control command unit 107 in the travel support device 100A acquires the speed of the merging vehicle VH used in the processing so far, and calculates an acceleration command that causes the speed of the merging vehicle VH to reach the speed indicated by the control amount output by the control switching unit 106.

After executing the processing of step ST370, the travel support device 100A terminates the processing.

Alternatively, the travel support device 100A repeats the processing from step ST310.

The travel support device of the present disclosure is further configured as follows.

The control amount output by the speed control unit and the control amount output by the inter-vehicle distance control unit are speed commands, and the travel support device further includes a vehicle control command unit to calculate an acceleration command that causes a speed of the merging vehicle to reach a speed indicated by the control amount output by the control switching unit.

As a result, the present disclosure has an effect of being able to provide a travel support device capable of outputting a control amount for causing a merging vehicle to reach a target speed by, for example, suppressing deceleration of the merging vehicle in order to avoid the merging destination vehicle when the merging vehicle changes lanes to the merging destination lane.

Furthermore, the present disclosure exhibits the same effect as the above effect by applying the above configuration to the above travel support method or the above program.

Fourth Embodiment

In a fourth embodiment, a detailed configuration of the travel support device 100A according to the fourth embodiment will be described using a mode in which the travel support device 100A is mounted on a merging vehicle.

Figure 10:
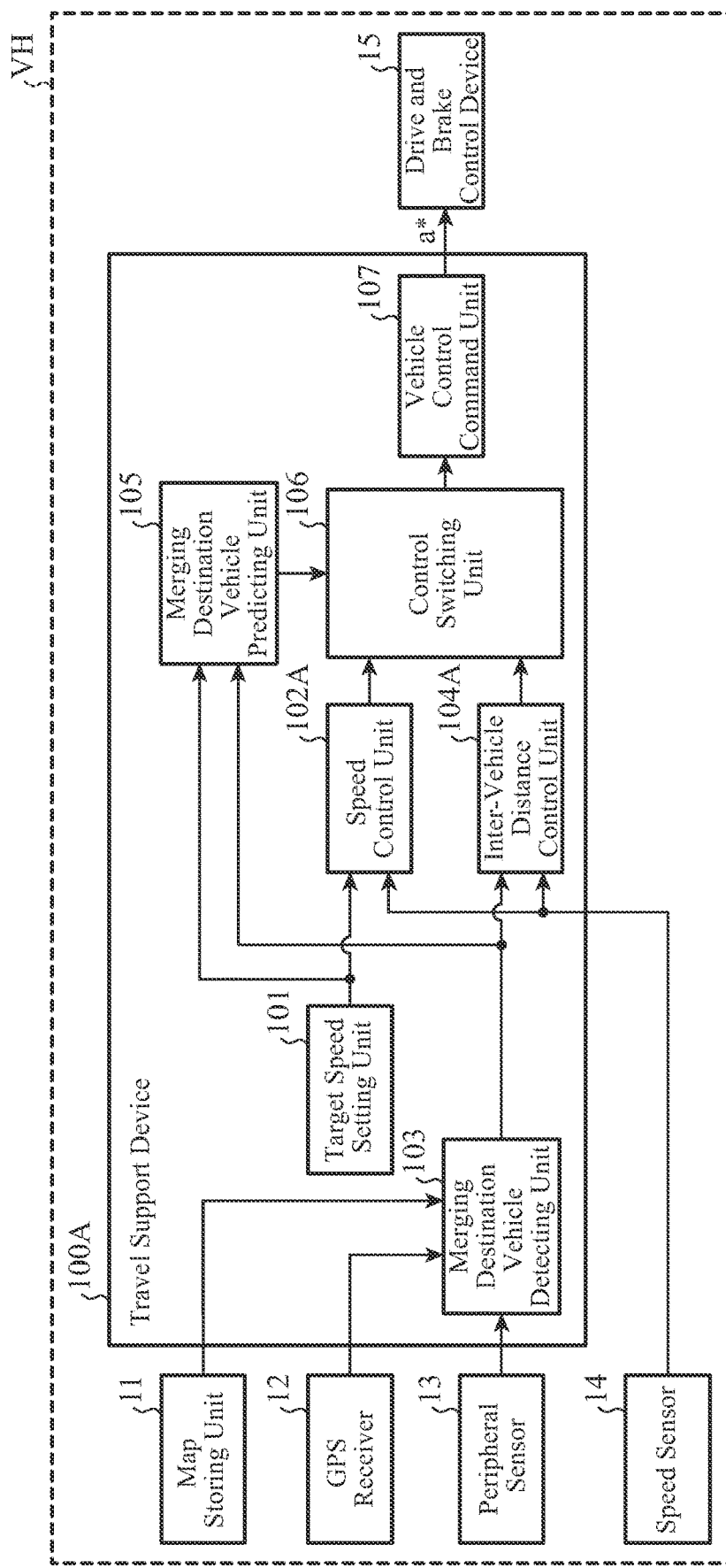
FIG. 10 is a diagram illustrating a configuration example of a travel support device according to a fourth embodiment.

FIG. 10 is a diagram illustrating a configuration example of a travel support device 100A according to the fourth embodiment.

The travel support device 100A according to the fourth embodiment includes a speed control unit 102A and an inter-vehicle distance control unit 104A instead of the speed control unit 102 and the inter-vehicle distance control unit 104, and newly includes a vehicle control command unit 107.

The target speed setting unit 101, the merging destination vehicle detecting unit 103, and the merging destination vehicle predicting unit 105 are similar to those of the first embodiment, the second embodiment, or the third embodiment, and thus descriptions thereof will be omitted.

The travel support device 100A includes the target speed setting unit 101, the speed control unit 102A, the merging destination vehicle detecting unit 103, the inter-vehicle distance control unit 104A, the merging destination vehicle predicting unit 105, the control switching unit 106, and the vehicle control command unit 107.

Detailed description of the configuration already described in the first embodiment, the second embodiment, or the third embodiment will be omitted here.

The speed control unit 102A calculates a speed command $V_{spd}*$ until the host vehicle VH reaches the target speed $V_{tgt}$ from the current speed V.

Figure 11:
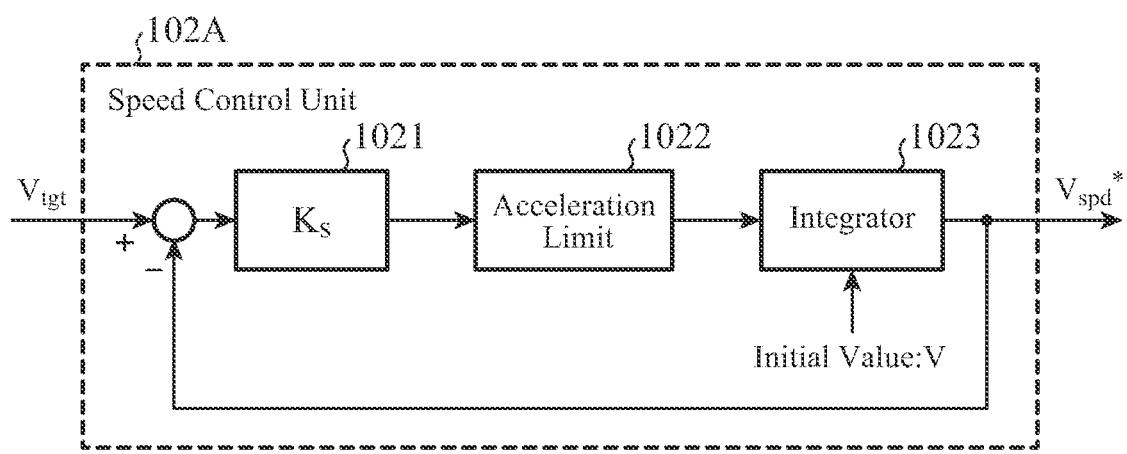
FIG. 11 is a diagram illustrating a configuration example of a speed control unit in the travel support device according to the fourth embodiment.

FIG. 11 is a diagram illustrating a configuration example of a speed control unit 102A in the travel support device 100A according to the fourth embodiment.

In FIG. 11, the internal configuration of the speed control unit 102A is expressed in the form of functional blocks.

The speed control unit 102A is a primary low-pass filter including a filter coefficient 1021, an acceleration limit 1022, and an integrator 1023, and having a target speed $V_{tgt}$ as an input.

Through this filtering processing, a speed command $V_{spd}*$ for accelerating or decelerating within a preset upper/lower limit range of acceleration is calculated until the current speed V reaches the target speed $V_{tgt}$.

The inter-vehicle distance control unit 104A calculates a speed command $V_{dist}*$ until the host vehicle VH reaches the target inter-vehicle distance $d_m*$ from the current inter-vehicle distance d and the speed reaches the speed $V_o$ of the main lane vehicle VO from the current speed V.

Figure 12:
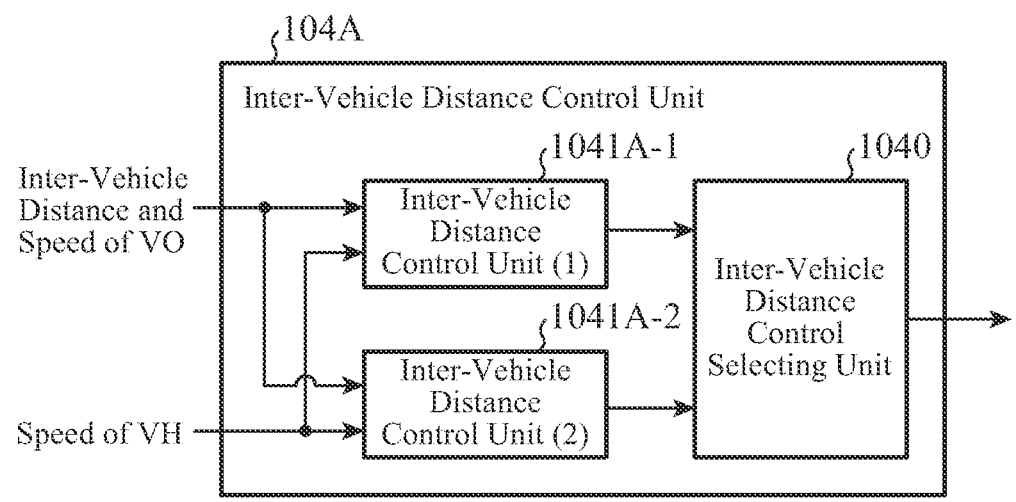
FIG. 12 is a diagram illustrating a configuration example of an inter-vehicle distance control unit in the travel support device according to the fourth embodiment.

FIG. 12 is a diagram illustrating a configuration example of the inter-vehicle distance control unit 104A in the travel support device 100A according to the fourth embodiment. In FIG. 12, the internal configuration of the inter-vehicle distance control unit 104A is expressed in the form of functional blocks.

The inter-vehicle distance control unit 104A includes an inter-vehicle distance control unit (1) 1041A-1, an inter-vehicle distance control unit (2) 1041A-2, and an inter-vehicle distance control selecting unit 1040A that selects one output from these outputs.

The configuration is the same as that of the inter-vehicle distance control unit 104 described above except that the control amount to be output is changed from acceleration to speed.

Figure 13:
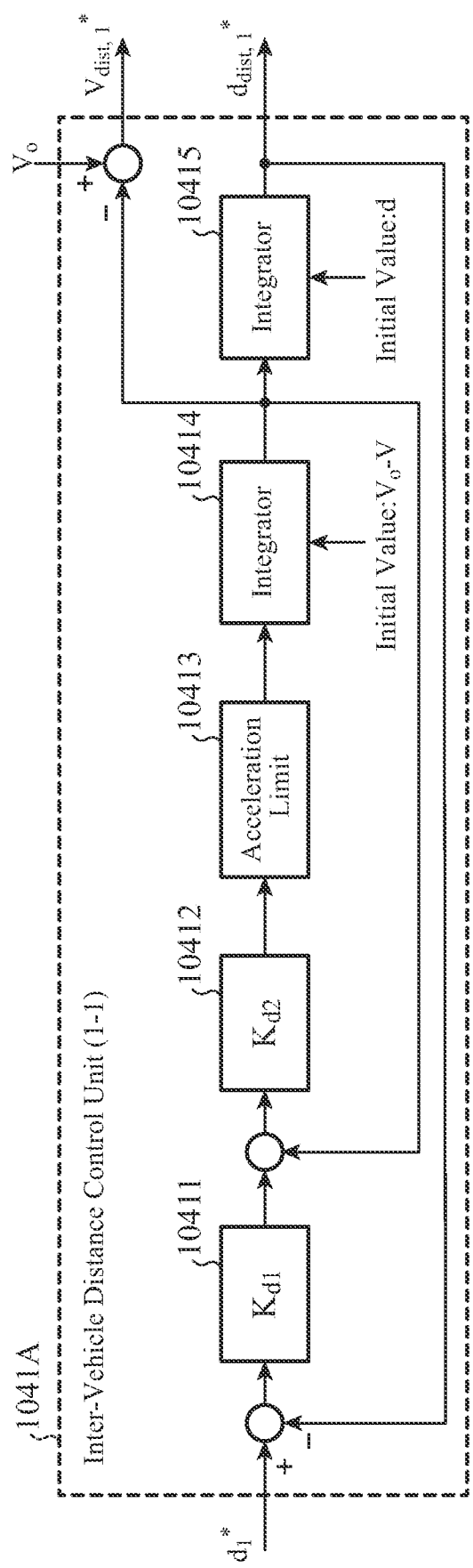
FIG. 13 is a diagram illustrating a configuration example of each inter-vehicle distance control unit (1-1) constituting an inter-vehicle distance control unit of the travel support device according to the fourth embodiment.

FIG. 13 is a diagram illustrating a configuration example of each inter-vehicle distance control unit (1-1) constituting the inter-vehicle distance control unit 104A of the travel support device 100A according to the fourth embodiment.

In FIG. 13, the internal configuration of one inter-vehicle distance control unit 1041A of the inter-vehicle distance control units 1041A-m is expressed in the form of functional blocks.

The inter-vehicle distance control unit 1041A is a secondary low-pass filter including a filter coefficient 10411, a filter coefficient 10412, an acceleration limit 10413, an integrator 10414, and an integrator 10415, and having a target inter-vehicle distance $d_1*$ as an input.

According to the present filtering processing, it is possible to calculate the inter-vehicle distance command $d_{dist,1}*$ which is a time change of the inter-vehicle distance operating within the range of the upper limit and the lower limit of the acceleration set in advance until the current inter-vehicle distance d reaches the target inter-vehicle distance $d_1*$.

Then, by subtracting the output of the first-stage integrator 10414 from the speed $V_o$ of the main lane vehicle VO, the speed command $V_{dist,1}*$ from the current speed V until reaching the speed $V_o$ of the main lane vehicle VO is calculated.

The inter-vehicle distance control selecting unit 1040A selects one of the speed command $V_{dist,1}*$ output from the inter-vehicle distance control unit 1041A and the speed command $V_{dist,2}*$ output from the inter-vehicle distance control unit 1042A, and outputs the selected command as the speed command $V_{dist}*$.

At this time, similarly to the first embodiment, the output in which the magnitude of the control amount (acceleration command) $a_{dist,m}*$ calculated by Equation (3) is the smallest is selected.

Similarly to the first embodiment, the second embodiment, or the third embodiment, the control switching unit 106 selects the output $V_{spd}*$ of the speed control unit 102A or the output $V_{dist}*$ of the inter-vehicle distance control unit 104A on the basis of the predicted position $d_{est}$ of the main lane vehicle VO, the speed information of the main lane vehicle VO, and the speed information of the host vehicle VH.

In the case of the present embodiment, the control amount output by the control switching unit 106 is the speed command $V*$.

The vehicle control command unit 107 calculates the acceleration command $a*$ so that the speed of the host vehicle VH coincides with the speed command $V*$.

For example, similarly to the speed control unit 102 of the first embodiment, the calculation is performed using the PI control as expressed by Equation (11).

$$a + K_{sp}(V^* - V) + K_{si} \int (V^* - V) dt \tag{11}$$

Processing of the travel support device 100A will be described.

When the processing is started, the travel support device 100A executes the target speed setting processing (step ST310). Specifically, the target speed setting unit 101 in the travel support device 100A outputs the target speed of the merging vehicle VH that is going to change lanes to the merging destination lane.

The travel support device 100A executes the speed control processing (step ST320).

Specifically, the speed control unit 102A acquires the current speed of the merging vehicle VH in the travel support device 100A, and calculates a control amount that matches the current speed with the target speed. The speed control unit 102A calculates a speed command as a control amount.

The travel support device 100A executes the merging destination vehicle detection processing (step ST330).

Specifically, the merging destination vehicle detecting unit 103 in the travel support device 100A acquires the position and speed of the merging destination vehicle VO that is a vehicle traveling in the merging destination lane.

The travel support device 100A executes the inter-vehicle distance control processing (step ST340).

Specifically, the inter-vehicle distance control unit 104A in the travel support device 100A acquires the current position of the merging vehicle VH, and calculates a control amount that maintains the inter-vehicle distance between the merging vehicle VH and the merging destination vehicle VO using the position of the merging vehicle VH, the position of the merging destination vehicle VO, and the speed of the merging destination vehicle VO. The inter-vehicle distance control unit 104A calculates a speed command as a control amount.

The travel support device 100A executes the merging destination vehicle prediction processing (step ST350).

Specifically, the merging destination vehicle predicting unit 105 in the travel support device 100A acquires the speed of the merging vehicle VH, and calculates the predicted position of the merging destination vehicle VO in a case where it is assumed that the current speed of the merging vehicle VH has reached the target speed using the speed of the merging vehicle VH, the target speed, the position of the merging destination vehicle VO, and the speed of the merging destination vehicle VO.

The travel support device 100A executes the control switching processing (step ST360).

Specifically, the control switching unit 106 in the travel support device 100A outputs one of the control amount by the speed control unit 102A and the control amount by the inter-vehicle distance control unit 104A using the speed of the merging vehicle VH, the speed of the merging destination vehicle VO, and the predicted position of the merging destination vehicle VO. The control amount output by the control switching unit 106 is a speed command.

The travel support device 100A executes the vehicle control command processing (step ST370).

Specifically, the vehicle control command unit 107 in the travel support device 100A calculates an acceleration command that causes the speed of the merging vehicle VH to reach the speed indicated by the control amount output by the control switching unit 106.

After executing the processing of step ST370, the travel support device 100A terminates the processing.

Alternatively, the travel support device 100A repeats the processing from ST310.

In the present embodiment, the merging destination vehicle predicting unit 105 determines whether or not a lane change can be made on the basis of the predicted position of the main lane vehicle VO at the target time when the host vehicle VH has reached the target speed, and selects one of speed control and inter-vehicle distance control.

As a result, when the host vehicle VH can avoid the main lane vehicle VO by accelerating to the target speed even when the main lane vehicle VO travels at the position that prevents the lane change at the current time, the speed control to accelerate to the target speed is selected.

Therefore, this makes it possible to suppress deceleration to avoid the main lane vehicle VO, and the merging vehicle VH can reach the target speed and change the lanes.

The travel support device of the present disclosure is further configured as follows.

The control amount output by the speed control unit and the control amount output by the inter-vehicle distance control unit are speed commands, and the travel support device further includes a vehicle control command unit to calculate an acceleration command that causes a speed of the merging vehicle to reach a speed indicated by the control amount output by the control switching unit.

As a result, the present disclosure has an effect of being able to provide a travel support device capable of outputting a control amount for causing a merging vehicle to reach a target speed by, for example, suppressing deceleration of the merging vehicle in order to avoid the merging destination vehicle when the merging vehicle changes lanes to the merging destination lane.

Furthermore, the present disclosure exhibits the same effect as the above effect by applying the above configuration to the above travel support method or the above program.

Fifth Embodiment

A travel support device according to a fifth embodiment will be described.

Figure 14:
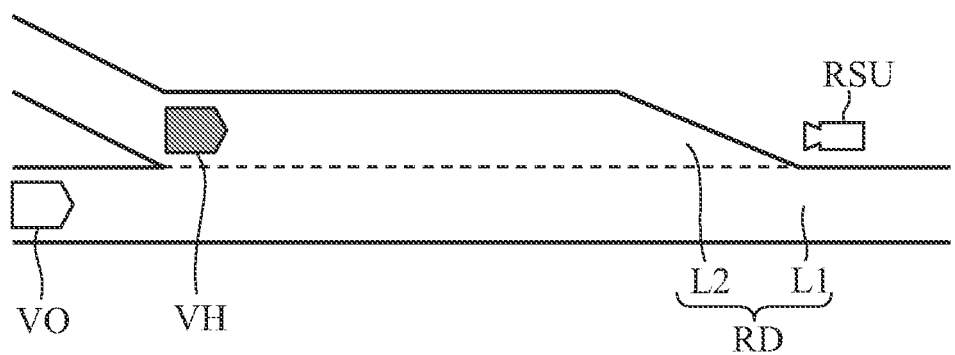
FIG. 14 is a diagram illustrating an example of a scene where the travel support device of the present disclosure is used.

FIG. 14 is a diagram illustrating an example of a scene where a travel support device 100B of the present disclosure is used.

Specifically, FIG. 14 illustrates a road RD such as a merging lane L2 and a merging destination lane L1, a merging vehicle VH, a merging destination vehicle VO, and a roadside device RSU in a scene where the travel support device 100B according to the fifth embodiment is used.

As illustrated in FIG. 14, the roadside device RSU is further installed on the roadside of the road RD.

Figure 15:
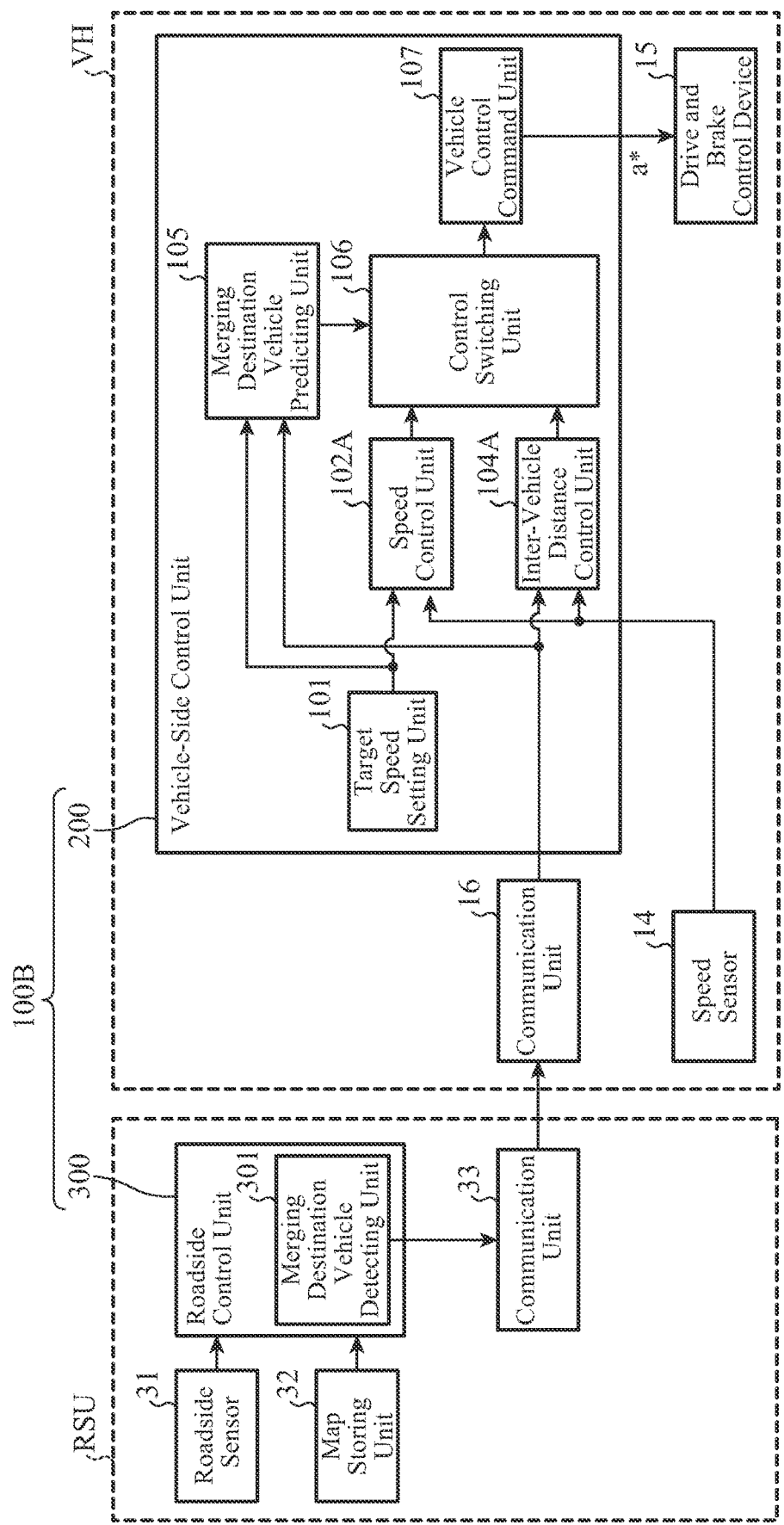
FIG. 15 is a diagram illustrating a configuration example of a travel support device according to a fifth embodiment.

FIG. 15 is a diagram illustrating a configuration example of the travel support device 100B according to the fifth embodiment.

In FIG. 15, a configuration including the travel support device 100B according to the fifth embodiment is expressed in the form of functional blocks.

A vehicle (merging vehicle VH) illustrated in FIG. 15 is mounted with a speed sensor 14, a drive and brake control device 15, a vehicle-side communication unit 16, and a vehicle-side control unit 200.

The vehicle-side communication unit 16 receives a signal from the roadside device RSU and outputs the received signal to the vehicle-side control unit 200.

The vehicle-side control unit 200 includes, as functional blocks, a target speed setting unit 101, a speed control unit 102A, an inter-vehicle distance control unit 104A, a merging destination vehicle predicting unit 105, a control switching unit 106, and a vehicle control command unit 107.

The inter-vehicle distance control unit 104A acquires the position information of the main lane vehicle VO and the speed information of the main lane vehicle VO from the communication unit 16.

The functions of the target speed setting unit 101, the speed control unit 102A, the inter-vehicle distance control unit 104A, the merging destination vehicle predicting unit 105, the control switching unit 106, and the vehicle control command unit 107 are similar to the each function of the travel support device 100A according to the second embodiment, and thus detailed description thereof will be omitted.

The roadside device RSU illustrated in FIG. 15 is mounted with a roadside sensor 31, a map storing unit 32, a roadside communication unit 33, and a roadside control unit 300.

The roadside sensor 31 detects an object on the road RD. The roadside sensor 31 particularly detects an object in the merging destination lane into which the merging vehicle VH merges.

That is, the roadside sensor 31 is another form of the peripheral sensor in the present disclosure described above.

The map storing unit 32 stores map information.

The roadside communication unit 33 transmits a signal from the roadside control unit 300 to the communication unit 16 of the host vehicle VH.

The travel support device 100B illustrated in FIG. 15 includes a vehicle-side control unit 200 and a roadside control unit 300.

The vehicle-side control unit 200 and the roadside control unit 300 of the travel support device 100B cooperate with each other via a communication function enabling mutual communication between the vehicle-side control unit 200 and the roadside control unit 300.

The vehicle-side control unit 200 of the travel support device 100B illustrated in FIG. 15 includes the target speed setting unit 101, the speed control unit 102A, the inter-vehicle distance control unit 104A, the merging destination vehicle predicting unit 105, the control switching unit 106, and the vehicle control command unit 107.

That is, the target speed setting unit 101, the speed control unit 102, the inter-vehicle distance control unit 104A, the merging destination vehicle predicting unit 105, and the control switching unit 106 are provided in the vehicle-side control unit 200 of the merging vehicle VH.

The roadside control unit 300 of the travel support device 100B illustrated in FIG. 15 includes a merging destination vehicle detecting unit 303.

The merging destination vehicle detecting unit 303 is provided in the roadside control unit 300 of the roadside device RSU installed on the roadside of the merging destination lane.

The merging destination vehicle detecting unit 303 detects the position information of the main lane vehicle VO and the speed information of the main lane vehicle VO on the basis of the information from the roadside sensor 31 and the information from the map storing unit 32.

The merging destination vehicle detecting unit 303 detects the position of the main lane vehicle VO and the speed of the main lane vehicle VO on the basis of the map information acquired by the map storing unit 32 and the position information of the peripheral objects and the speed information of the peripheral objects acquired by the roadside sensor 31.

More specifically, the merging destination vehicle detecting unit 303 collates position information of peripheral objects and speed information of peripheral objects with map information, and selects an object present on the main lane L1 from among the peripheral objects.

Then, the merging destination vehicle detecting unit 303 outputs the position information of the selected object and the speed information of the selected object to the communication unit 33 as the position information of the main lane vehicle VO and the speed information of the main lane vehicle VO.

Then, the communication unit 33 transmits the position information of the main lane vehicle VO and the speed information of the main lane vehicle VO to the host vehicle VH.

Other configurations of the travel support device 100B according to the fifth embodiment are similar to those of the travel support devices 100A according to the third and fourth embodiments.

Figure 16:
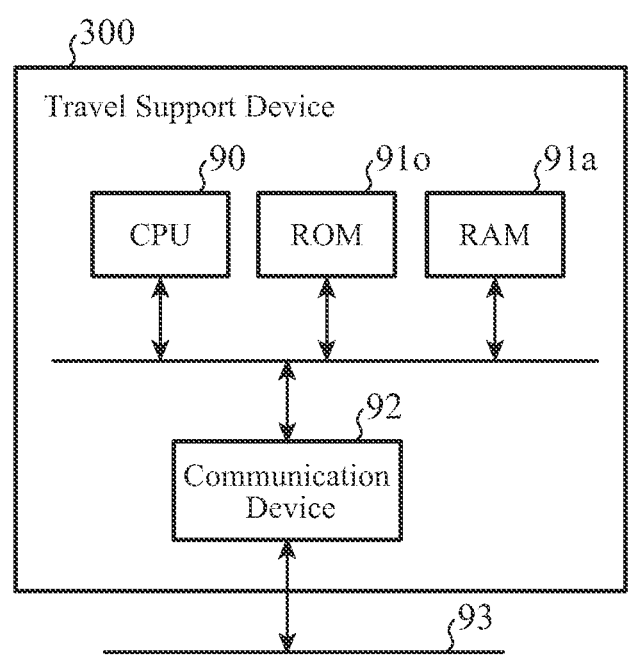
FIG. 16 is a diagram illustrating an example of a hardware configuration that implements each function of a roadside control unit in FIG. 15.

FIG. 16 is a diagram illustrating an example of a hardware configuration that implements each function of the roadside control unit 300 in FIG. 15.

The roadside control unit 300 includes an arithmetic processing device 90, a plurality of storage devices 91, a communication device 92, and an internal network 93.

For example, a CPU is used as the arithmetic processing device 90.

The plurality of storage devices 91 transmit and receive data to and from the arithmetic processing device 90, and store data.

The communication device 92 performs data communication with the internal network 93.

The communication device 92 communicates with the roadside sensor 21 and the map storing unit 22 as external devices via the internal network 93.

Furthermore, the arithmetic processing device 90 may include, for example, an ASIC, an IC, a DSP, an FPGA, various logic circuits, and various signal processing circuits.

Furthermore, by providing a plurality of arithmetic processing devices 90 of the same type or different types, each processing may be shared and executed by a plurality of arithmetic processing devices.

As the plurality of storage devices 91, for example, a RAM configured to be able to read and write data from the arithmetic processing device 90 and a ROM configured to be able to read data from the arithmetic processing device 90 are provided.

The function of the roadside control unit 300 is implemented by the arithmetic processing device 90 executing software or a program stored in the plurality of storage devices 91 and cooperating with other hardware of the roadside device RSU such as the plurality of storage devices 91 and the communication device 92.

Note that, setting data used by each function of the roadside control unit 300 is stored in a plurality of storage devices 91 as a part of software or a program.

Since the processing of the travel support device 100B is similar to the processing of the travel support device described above, a detailed description thereof will be omitted here.

In the travel support device 100B described above, the merging destination vehicle detecting unit 303 is provided in the roadside control unit 300 in the roadside device RSU.

In addition, the target speed setting unit 101, the speed control unit 102A, the inter-vehicle distance control unit 104A, the merging destination vehicle predicting unit 105, the control switching unit 106, and the vehicle control command unit 107 are provided in the vehicle-side control unit 200 in the host vehicle VH.

Then, on the basis of the position information of the host vehicle VH and the speed information of the host vehicle VH, and the position information of the main lane vehicle VO and the speed information of the main lane vehicle VO detected by the roadside device RSU, the acceleration command a* of the host vehicle VH is output from the vehicle-side control unit 200 to the drive and brake control device 15.

According to this, even when the main lane vehicle VO is present in the blind spot of the peripheral sensor of the host vehicle VH, the position information of the main lane vehicle VO and the speed information of the main lane vehicle VO can be detected. As a result, the host vehicle VH can be more smoothly moved to the main lane.

The travel support device of the present disclosure is further configured as follows.

The merging destination vehicle detecting unit is provided in a roadside control unit in a roadside device installed on a roadside of the merging destination lane, and the target speed setting unit, the speed control unit, the inter-vehicle distance control unit, the merging destination vehicle predicting unit, and the control switching unit are provided in a vehicle-side control unit in the merging vehicle.

As a result, the present disclosure has an effect of being able to provide a travel support method capable of acquiring information related to a vehicle traveling in a merging destination lane and preventing the merging vehicle from obstructing a traffic flow at the merging destination even when the merging destination lane is a blind spot as viewed from the merging vehicle.

Furthermore, the present disclosure exhibits the same effect as the above effect by applying the above configuration to the above travel support method or the above program.

Sixth Embodiment

A travel support device according to a sixth embodiment will be described.

Figure 17:
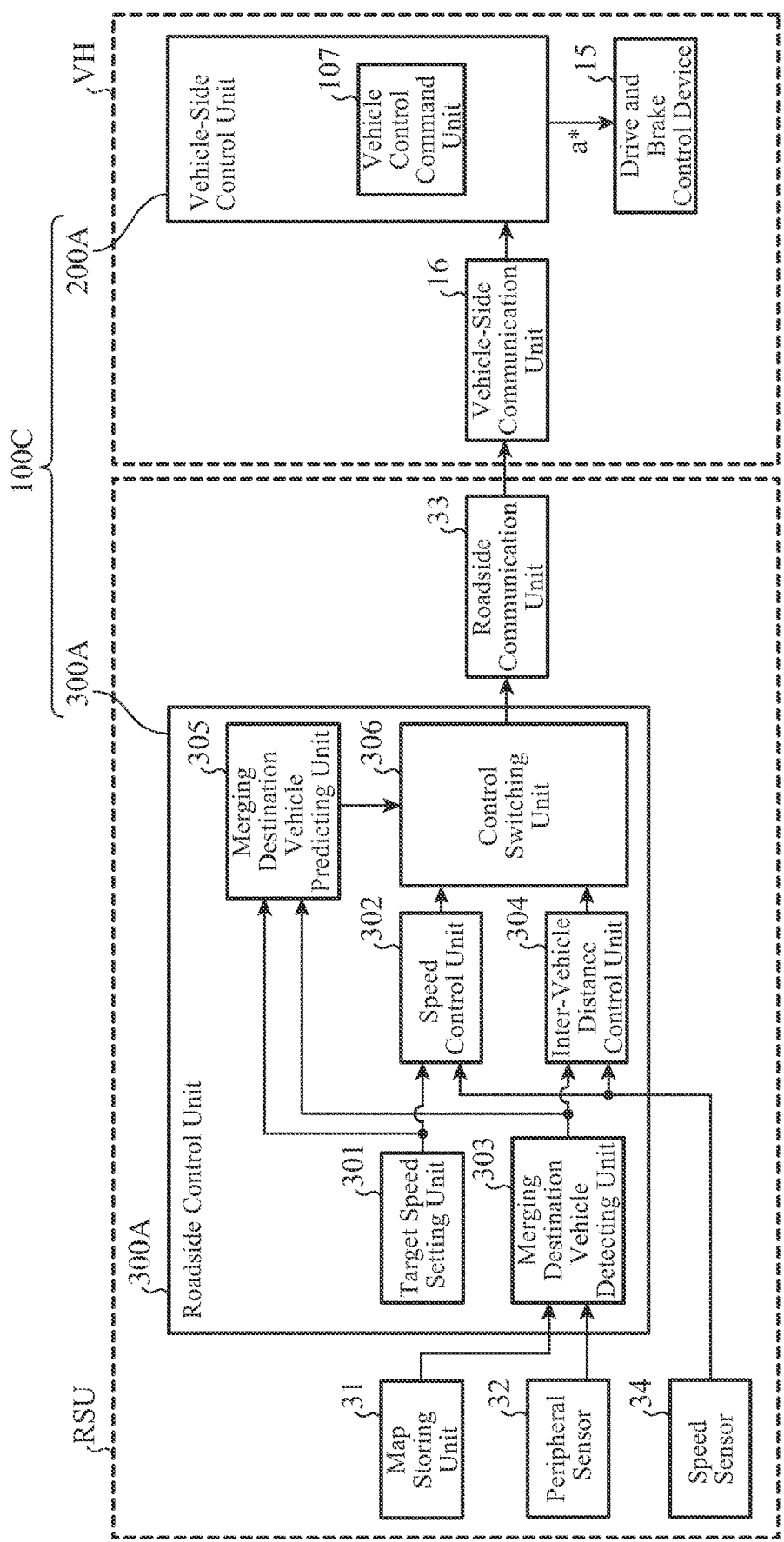
FIG. 17 is a diagram illustrating a configuration example of a travel support device according to a sixth embodiment.

FIG. 17 is a diagram illustrating a configuration example of a travel support device 100C according to the sixth embodiment.

In FIG. 17, the configuration including the travel support device 100C according to the sixth embodiment is expressed in the form of functional blocks.

A vehicle (merging vehicle VH) is mounted with a drive and brake control device 15, a vehicle-side communication unit 16, and a vehicle-side control unit 200A.

The roadside device RSU is mounted with a roadside sensor (peripheral sensor) 31, a map storing unit 32, a speed sensor 34, a roadside communication unit 33, and a roadside control unit 300A.

The travel support device 100C includes a vehicle-side control unit 200A and a roadside control unit 300A.

The vehicle-side control unit 200A and the roadside control unit 300A of the travel support device 100C cooperate with each other via a communication function enabling mutual communication between the vehicle-side control unit 200A and the roadside control unit 300A.

The travel support device 100C is different from the travel support device 100 described above particularly in the arrangement position of the internal configuration in the travel support device 100C.

The vehicle-side control unit 200A of the travel support device 100C illustrated in FIG. 17 includes a vehicle control command unit 107.

That is, the vehicle control command unit 107 is provided in the vehicle-side control unit 200A in the merging vehicle.

The vehicle control command unit 107 has a function similar to that of the vehicle control command unit 107 described above.

The vehicle control command unit 107 is different from the vehicle control command unit 107 described above in that information used for processing is acquired via the vehicle-side communication unit.

The vehicle control command unit 107 receives the speed command V* generated on the roadside device RSU side from the communication unit 16 of the host vehicle VH.

Since the vehicle control command unit 107 is similar to the vehicle control command unit 107 of the travel support device 100A described above, the detailed description thereof will be omitted.

The roadside control unit 300A of the travel support device 100C illustrated in FIG. 17 includes a target speed setting unit 301, a speed control unit 302, a merging destination vehicle detecting unit 303, an inter-vehicle distance control unit 304, a merging destination vehicle predicting unit 305, and a control switching unit 306.

That is, the target speed setting unit 301, the speed control unit 302, the merging destination vehicle detecting unit 303, the inter-vehicle distance control unit 304, the merging destination vehicle predicting unit 305, and the control switching unit 306 are provided in the roadside control unit 300 of the roadside device RSU installed on the roadside of the merging destination lane.

As described above, the travel support device 100C is different from the travel support device 100B of the third embodiment in that the target speed setting unit 301, the speed control unit 302, the merging destination vehicle detecting unit 303, the inter-vehicle distance control unit 304, the merging destination vehicle predicting unit 305, and the control switching unit 306 are included in the roadside control unit 300A, and the speed command V* is transmitted from the roadside device RSU to the host vehicle VH.

Processing executed by the target speed setting unit 301, the speed control unit 302, the merging destination vehicle detecting unit 303, the inter-vehicle distance control unit 304, the merging destination vehicle predicting unit 305, and the control switching unit 306 is similar to that executed by the target speed setting unit 101, the speed control unit 102A, the merging destination vehicle detecting unit 103, the inter-vehicle distance control unit 104A, the merging destination vehicle predicting unit 105, and the control switching unit 106 according to the third and fourth embodiments, and thus detailed descriptions thereof will be omitted.

The vehicle-side control unit 200A receives the speed command V* from the roadside device RSU by the communication unit 16 of the host vehicle VH.

The vehicle-side control unit 200A calculates an acceleration command a* on the basis of the speed command V*, and outputs the acceleration command a* to the drive and brake control device 15.

According to the travel support device 100C described above, the target speed setting unit 301, the speed control unit 302, the merging destination vehicle detecting unit 303, the inter-vehicle distance control unit 304, the merging destination vehicle predicting unit 305, and the control switching unit 306 are provided in the roadside control unit 300A in the roadside device RSU.

In addition, the vehicle control command unit 107 is provided in the vehicle-side control unit 200A in the host vehicle VH.

As a result, even when the host vehicle VH does not include any of the peripheral sensor and the GPS receiver, the host vehicle VH can be more smoothly moved to the main lane.

The travel support device of the present disclosure is further configured as follows.

The target speed setting unit, the speed control unit, the merging destination vehicle detecting unit, the inter-vehicle distance control unit, the merging destination vehicle predicting unit, and the control switching unit are provided in a roadside control unit in a roadside device installed on a roadside of the merging destination lane, and the vehicle control command unit is provided in a vehicle-side control unit in the merging vehicle.

As a result, the present disclosure has an effect of being able to provide a travel support method capable of preventing a merging vehicle from obstructing a traffic flow at a merging destination by acquiring information related to a vehicle traveling in a merging destination lane even when the merging vehicle does not include a peripheral sensor and a GPS receiver.

Furthermore, the present disclosure exhibits the same effect as the above effect by applying the above configuration to the above travel support method or the above program.

Note that the present disclosure can freely combine the respective embodiments, modify any component of the respective embodiments, or omit any component of the respective embodiments within the scope of the invention. For example, in the fifth or sixth embodiment, the speed control unit 102A and the inter-vehicle distance control unit 104A may use the acceleration as the control amount as in the first or second embodiment.

Since the travel support device of the present disclosure can prevent the merging vehicle from obstructing the traffic flow at the merging destination, the travel support device is suitable for use in, for example, a travel support device that supports traveling at a merging point of an expressway.

REFERENCE SIGNS LIST 11, 32: map storing unit, 12: GPS receiver, 13: peripheral sensor, 14, 34: speed sensor, 15: drive and brake control device, 16: vehicle-side communication unit, 31: roadside sensor (peripheral sensor), 33: roadside communication unit, 100, 100A, 100B, 100C: travel support device, 101: target speed setting unit, 102, 102A, 302: speed control unit, 103, 301, 303: merging destination vehicle detecting unit, 104, 104A, 304: inter-vehicle distance control unit, 105, 305: merging destination vehicle predicting unit, 106, 306: control switching unit, 107: vehicle control command unit, 200, 200A: vehicle-side control unit, 300, 300A: roadside control unit, L1: merging destination lane (main lane), L2: merging lane, RSU: roadside device, VH: merging vehicle, VO: merging destination vehicle (main lane vehicle)

The invention claimed is:

1. A travel support device comprising:
processing circuitry configured to
output a target speed of a merging vehicle that is going to change lanes to a merging destination lane;
acquire a current speed of the merging vehicle and calculate a first control amount that matches the current speed with the target speed;
acquire a position and a speed of at least one merging destination vehicle that is a vehicle traveling in the merging destination lane;
acquire a current position of the merging vehicle and calculate a second control amount that maintains a first inter-vehicle distance between the merging vehicle and the at least one merging destination vehicle by using a position of the merging vehicle, a position of the at least one merging destination vehicle, and a speed of the at least one merging destination vehicle;
acquire a speed of the merging vehicle and calculate a predicted position of the at least one merging destination vehicle in a case where it is assumed that the current speed of the merging vehicle has reached the target speed by using the speed of the merging vehicle, the target speed, the position of the at least one merging destination vehicle, and the speed of the at least one merging destination vehicle; and
output one of the first control amount and the second control amount by using the speed of the merging vehicle, the speed of the at least one merging destination vehicle, and the predicted position of the at least one merging destination vehicle.

2. The travel support device according to claim 1, wherein the processing circuitry is configured to
output the first control amount when the predicted position of the at least one merging destination vehicle is not present within a predetermined range ahead of or behind the predicted position of the merging vehicle; and
output the second control amount when the predicted position of the at least one merging destination vehicle is present within the predetermined range ahead of or behind the predicted position of the merging vehicle.

3. The travel support device according to claim 1, wherein the predicted position of the at least one merging destination vehicle is indicated by using a second inter-vehicle distance between the merging vehicle and the at least one merging destination vehicle at a target time at which the merging vehicle is supposed to accelerate within a range of a predetermined acceleration limit and reach the target speed.

4. The travel support device according to claim 1, wherein the target speed is a legal speed limit of the merging destination lane.

5. The travel support device according to claim 1, wherein the processing circuitry is further configured to
calculate a third control amount that maintains an inter-vehicle distance between the merging vehicle and the at least one merging destination vehicle ahead of the merging vehicle; and
calculate a fourth control amount that maintains an inter-vehicle distance between the merging vehicle and the at least one merging destination vehicle behind the merging vehicle; and
outputs a fifth control amount selected from among the third control amount and the fourth control amount on a basis of a predetermined condition related to magnitudes of control amounts.

6. The travel support device according to claim 5, wherein the at least one merging destination vehicle includes a plurality of merging destination vehicles, and the processing circuitry is configured to
output a fifth control amount selected from among the third control amount calculated from each of the plurality of merging destination vehicles and fourth control amount calculated from each of a plurality of merging destination vehicles on a basis of a predetermined condition related to magnitudes of control amounts.

7. The travel support device according to claim 1, wherein the first control amount and the second control amount are acceleration commands, and
the processing circuitry is configured to output the acceleration commands to a drive and brake control device that controls drive and brake of the merging vehicle.

8. The travel support device according to claim 1, wherein the first control amount and the second control amount are speed commands, and
the processing circuitry is configured to calculate an acceleration command that causes a speed of the merging vehicle to reach a speed indicated by the first or second control amount.

9. The travel support device according to claim 8, wherein a function of outputting the target speed of the merging vehicle, a function of calculating the first control amount, a function of acquiring the position and the speed of the at least one merging destination vehicle, a function of calculating the second control amount, a function of calculating the predicted position of the at least one merging destination vehicle, and a function of outputting one of the first control amount and the second control amount are provided in a roadside device installed on a roadside of the merging destination lane, and a function of calculating the acceleration command is provided in the merging vehicle.

10. The travel support device according to claim 1, wherein a function of acquiring the position and the speed of the at least one merging destination vehicle is provided in a roadside device installed on a roadside of the merging destination lane, and a function of outputting the target speed of the merging vehicle, a function of calculating the first control amount, a function of calculating the second control amount, a function of calculating the predicted position of the at least one merging destination vehicle, and a function of outputting one of the first control amount and the second control amount are provided in the merging vehicle.

11. A travel support method comprising:

outputting a target speed of a merging vehicle that is going to change lanes to a merging destination lane;

acquiring a current speed of the merging vehicle and calculating a first control amount that matches the current speed with the target speed;

acquiring a position and a speed of at least one merging destination vehicle that is a vehicle traveling in the merging destination lane;

acquiring a current position of the merging vehicle and calculating a second control amount that maintains a first inter-vehicle distance between the merging vehicle and the at least one merging destination vehicle by using a position of the merging vehicle, a position of the at least one merging destination vehicle, and a speed of the at least one merging destination vehicle;

acquiring a speed of the merging vehicle and calculating a predicted position of the at least one merging destination vehicle in a case where it is assumed that the current speed of the merging vehicle has reached the target speed by using the speed of the merging vehicle, the target speed, the position of the at least one merging destination vehicle, and the speed of the at least one merging destination vehicle; and outputting one of the first control amount and the second control amount by using the speed of the merging vehicle, the speed of the at least one merging destination vehicle, and the predicted position of the at least one merging destination vehicle.

12. A non-transitory computer readable medium with an executable program stored thereon, wherein the program instructs a computer to perform:

outputting a target speed of a merging vehicle that is going to change lanes to a merging destination lane;

acquiring a current speed of the merging vehicle and calculate a first control amount that matches the current speed with the target speed;

acquiring a position and a speed of at least one merging destination vehicle that is a vehicle traveling in the merging destination lane;

acquiring a current position of the merging vehicle and calculate a second control amount that maintains a first inter-vehicle distance between the merging vehicle and the at least one merging destination vehicle by using a position of the merging vehicle, a position of the at least one merging destination vehicle, and a speed of the at least one merging destination vehicle;

acquiring a speed of the merging vehicle and calculate a predicted position of the at least one merging destination vehicle in a case where it is assumed that the current speed of the merging vehicle has reached the target speed by using the speed of the merging vehicle, the target speed, the position of the at least one merging destination vehicle, and the speed of the at least one merging destination vehicle; and outputting one of the first control amount and the second control amount by using the speed of the merging vehicle, the speed of the at least one merging destination vehicle, and the predicted position of the at least one merging destination vehicle.

* * * * *